(12) United States Patent
Kan et al.

(10) Patent No.: US 11,402,668 B2
(45) Date of Patent: Aug. 2, 2022

(54) FRAME COMPONENT, TEMPLE, FRAME, AND EYEWEAR

(71) Applicant: Mitsui Chemicals, Inc., Tokyo (JP)

(72) Inventors: Ryuki Kan, Nagoya (JP); Takafumi Ohto, Nagoya (JP); Osamu Masuda, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 222 days.

(21) Appl. No.: 16/650,400

(22) PCT Filed: Sep. 21, 2018

(86) PCT No.: PCT/JP2018/035202
§ 371 (c)(1),
(2) Date: Mar. 25, 2020

(87) PCT Pub. No.: WO2019/059380
PCT Pub. Date: Mar. 28, 2019

(65) Prior Publication Data
US 2020/0225510 A1      Jul. 16, 2020

(30) Foreign Application Priority Data

Sep. 25, 2017  (JP) .............................. JP2017-183305
Sep. 25, 2017  (JP) .............................. JP2017-183307

(51) Int. Cl.
*G02C 5/14*       (2006.01)
*G02C 11/04*      (2006.01)
(Continued)

(52) U.S. Cl.
CPC .............. *G02C 11/04* (2013.01); *F21L 4/027* (2013.01); *G02C 5/146* (2013.01); *G02C 7/06* (2013.01);
(Continued)

(58) Field of Classification Search
CPC ................ F21L 4/027; G02B 27/0172; G02B 2027/0178; G02C 11/04; G02C 11/00;
(Continued)

(56) References Cited

U.S. PATENT DOCUMENTS 6,091,546 A    7/2000   Spitzer
8,203,502 B1   6/2012   Chi et al.
(Continued)

FOREIGN PATENT DOCUMENTS

CN      101320140 A    12/2008
GB        2484285 A     4/2012
(Continued)

OTHER PUBLICATIONS

International Search Report from International Application No. PCT/JP2018/035202 dated Dec. 18, 2018.

*Primary Examiner* — William R Alexander
(74) *Attorney, Agent, or Firm* — Brundidge & Stanger, P.C.

(57) ABSTRACT

This frame component constituting a frame of eyewear is provided with: a housing having a first surface that has a first recess portion formed therein, and a first hole that opens to the first recess portion; a first device disposed in the first recess portion; and a fastening member inserted into the first hole and fixing the first device to the housing. Through this configuration, a frame component is provided which can reduce the thickness dimension of a portion in which a device is provided.

19 Claims, 18 Drawing Sheets

(51) Int. Cl.
*F21L 4/02* (2006.01)
*G02C 7/06* (2006.01)
*G02C 11/00* (2006.01)
*G02B 27/01* (2006.01)

(52) U.S. Cl.
CPC .......... *G02C 11/10* (2013.01); *G02B 27/0172* (2013.01); *G02B 2027/0178* (2013.01)

(58) Field of Classification Search
CPC ........ G02C 11/10; G02C 5/143; G02C 5/146; G02C 5/14
USPC .................................................. 351/111, 158
See application file for complete search history.

(56) References Cited

U.S. PATENT DOCUMENTS

| | | | |
|---|---|---|---|
| 9,759,933 B1* | 9/2017 | Lin | G02C 11/10 |
| 9,910,298 B1* | 3/2018 | Sales | G02C 11/10 |
| 9,971,171 B1* | 5/2018 | Lin | H01M 50/247 |
| 2007/0046890 A1* | 3/2007 | Chen | G02C 11/00 |
| | | | 351/120 |
| 2008/0013041 A1 | 1/2008 | Chou | |
| 2008/0297717 A1 | 12/2008 | Fukuoka | |
| 2010/0220282 A1* | 9/2010 | Moritz | G02C 11/02 |
| | | | 351/158 |
| 2011/0013135 A1* | 1/2011 | Waters | G02C 11/04 |
| | | | 351/158 |
| 2011/0075095 A1 | 3/2011 | Waters | |
| 2011/0102733 A1* | 5/2011 | Moritz | G02C 11/06 |
| | | | 351/52 |
| 2011/0187989 A1* | 8/2011 | Waters | G02C 11/04 |
| | | | 351/158 |
| 2012/0002159 A1* | 1/2012 | Blum | G02C 5/146 |
| | | | 351/113 |
| 2012/0127420 A1* | 5/2012 | Blum | G02C 5/146 |
| | | | 351/113 |
| 2012/0127423 A1* | 5/2012 | Blum | G02C 7/083 |
| | | | 351/158 |
| 2013/0010256 A1* | 1/2013 | Haddock | G02C 5/2272 |
| | | | 351/159.31 |
| 2013/0249849 A1 | 9/2013 | Wong | |
| 2014/0092327 A1 | 4/2014 | Machida et al. | |
| 2014/0293215 A1* | 10/2014 | Blum | G02C 5/146 |
| | | | 351/119 |
| 2015/0131048 A1* | 5/2015 | Iurilli | G02C 5/22 |
| | | | 351/158 |
| 2016/0131913 A1* | 5/2016 | Kim | G02C 5/20 |
| | | | 359/630 |
| 2016/0261956 A1 | 9/2016 | Collini | |
| 2017/0242276 A1* | 8/2017 | Willey | H01R 35/04 |

FOREIGN PATENT DOCUMENTS

| | | |
|---|---|---|
| JP | 04-093821 U | 8/1992 |
| JP | 2001-522063 A | 11/2001 |
| JP | 2013506876 A | 2/2013 |
| JP | 2013-134259 A | 7/2013 |
| JP | 2017-049415 A | 3/2017 |
| JP | 2017-049565 A | 3/2017 |
| WO | 2013/088630 A1 | 6/2013 |

* cited by examiner

FRAME COMPONENT, TEMPLE, FRAME, AND EYEWEAR

TECHNICAL FIELD

The present invention relates to a frame component, a temple, a frame, and an eyewear.

BACKGROUND ART

Patent Literature (hereinafter abbreviated as PTL) 1 discloses an invention relating to electronic glasses including a pair of lenses each including a variable focus section. In the case of such electronic glasses, the variable focus section is configured to be capable of switching the focal length (also called refractive index) based on voltage application.

To control the switching of the focal length of the variable focus section, the electronic glasses described in PTL 1 includes a plurality of devices, such as a power supply section, a sensor section, a controller, and a circuit section, disposed on the outer surface of the temple.

PTL 2 discloses an invention relating to electronic glasses including a pair of lenses capable of switching the state of the electronic glasses between a transmission state and a non-transmission state based on voltage application.

In the electronic glasses described in PTL 2, the temples each include a control apparatus that switches the state of the electronic glasses between the transmission state and the non-transmission state. The electronic glasses described in PTL 2 further includes a light source (LED) that is disposed in an internal space of each of the temples and outputs light according to the state of the electronic glasses. The light output from the thus configured light source is guided via a light guiding member and exits out of the temple.

CITATION LIST

Patent Literature

PTL 1
WO2013/088630
PTL 2
Japanese Patent Application Laid-Open No. 2017-49565

SUMMARY OF INVENTION

Technical Problem

In the case of the electronic glasses described in PTL 1, the plurality of devices described above are provided on the outer surface, which is a flat surface, of each of the temples. The dimension of the portion of the temple where the plurality of devices described above are provided is therefore undesirably likely to increase.

An object of the present invention is to provide a frame component, a temple, a frame, and an eyewear that allow reduction in the dimension of a portion where a device is provided.

Solution to Problem

Advantageous Effects of Invention

The present invention can provide a frame component, a temple, a frame, and an eyewear that allow reduction in the dimension of a portion where a device is provided.

DESCRIPTION OF EMBODIMENTS

Some embodiments of the present invention will be described below in detail with reference to the accompanying drawings. As a representative example of an eyewear that incorporates a frame component, a temple, and a frame according to the present invention, the following description will be made of electronic glasses including lenses each having an electrically active area where the optical characteristics thereof are changed by electrical control.

Embodiment 1

(Configuration of Electronic Glasses)

Figure 1:
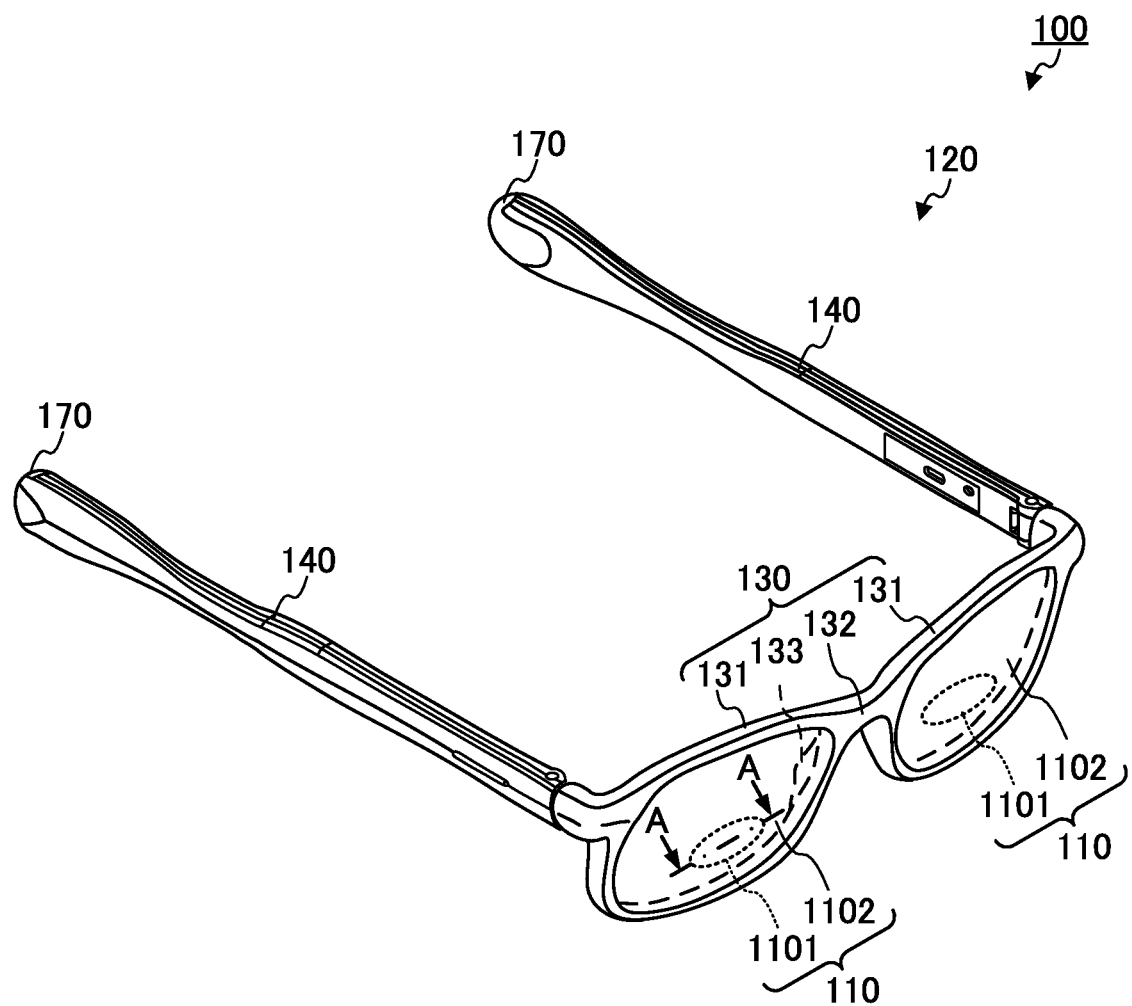
FIG. 1 is a perspective view illustrating an example of the configuration of electronic glasses according to Embodiment 1.
Figure 2:
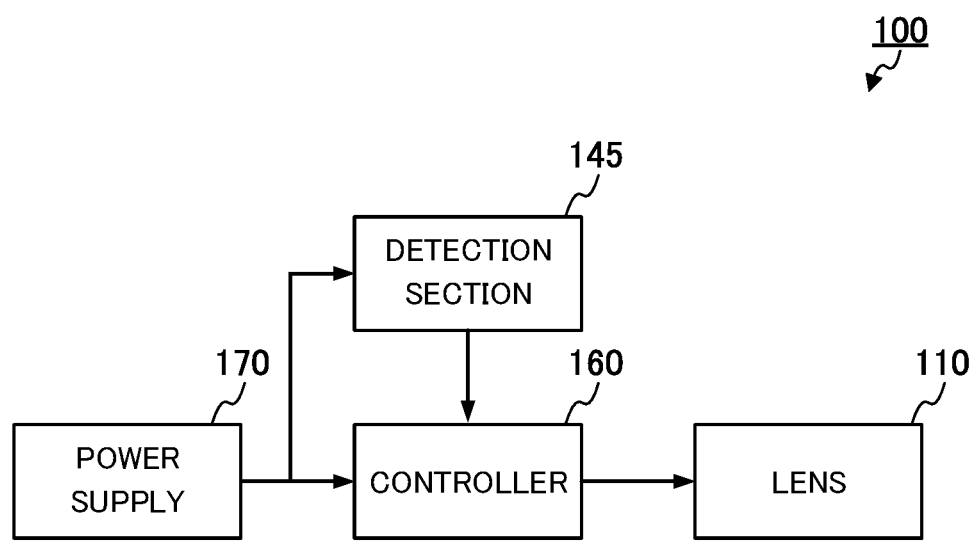
FIG. 2 is block diagram illustrating an internal circuit of the electronic glasses.

FIG. 1 is a perspective view illustrating an example of the configuration of electronic glasses 100 according to the present embodiment. FIG. 2 is block diagram illustrating an internal circuit of electronic glasses 100 according to the present embodiment. Electronic glasses 100 includes a pair of lenses 110, frame 120, controller 160 (see FIG. 2), and power supplies 170.

Frame 120 includes front portion 130 and a pair of temples 140 (also referred to as frame component). The description will be made of a case where a portion where front portion 130 is disposed faces the forward (front) side of electronic glasses 100.

In the following description, unless otherwise stated, a "frontward/rearward direction," a "width direction," and an "upward/downward direction" refer to the directions of electronic glasses 100 in a developed state (state illustrated in FIG. 1) that allows a user to wear electronic glasses 100.

As an example, the frontward/rearward direction of electronic glasses 100 is the frontward/rearward direction of the user wearing electronic glasses 100. The width direction of electronic glasses 100 is the rightward/leftward direction of the user wearing electronic glasses 100. Further, the upward/downward direction of electronic glasses 100 is the direction toward the top and bottom of the user wearing electronic glasses 100.

(Lenses)

Figure 3:
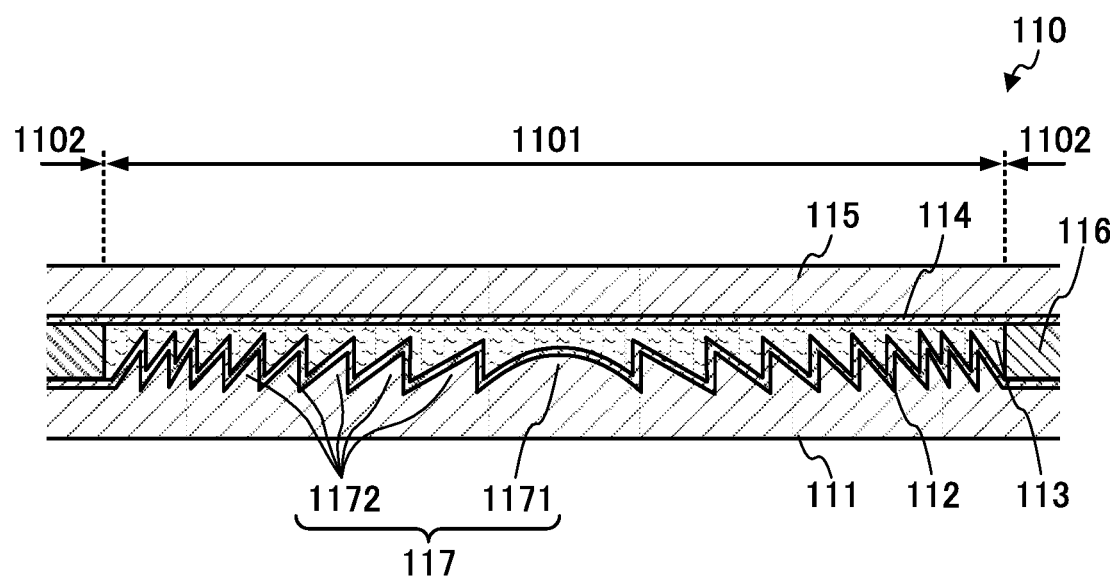
FIG. 3 is a diagrammatic cross-sectional view for describing an example of the configuration of a lens.

FIG. 3 is a cross-sectional view taken along the line A-A in FIG. 1 and is a diagrammatic cross-sectional view for describing an example of the configuration of each of lenses 110. In FIG. 3, the curvature of lens 110 is zero.

The pair of lenses 110 are so formed as to be bilaterally symmetric in the rightward/leftward direction when electronic glasses 100 are viewed from the front and include the same constituent elements. Therefore, in the following description, lens 110 for the right eye out of lenses 110 of electronic glasses 100 will be described, and the constituent elements of lens 110 for the left eye will not be described.

Lens 110 has first area 1101 (also referred to as electrically active area), where the focal length (strength) of lens 110 is switchable based on voltage, and second area 1102, which occupies the area excluding first area 1101. Lens 110 may be a spherical lens or an aspheric lens. The shape of lens 110 can be adjusted as appropriate in accordance with intended optical power thereof.

The shape, size, and position of first area 1101 can be designed as appropriate in accordance, for example, with the size of lens 110 and the purpose of lens 110. Examples of the purpose of lens 110 may include a long/short-range bifocal lens, an intermediate/short-range bifocal lens, and short/short-range bifocal lens. Examples of the shape of first area 1101 may include a circular shape and an elliptical shape.

In the present embodiment, first area 1101 has an elliptical shape having a major axis extending in the rightward/leftward direction (also referred to as width direction) of electronic glasses 100. First area 1101 is disposed below a central portion of lens 110 when lens 110 is viewed from the front, as illustrated in FIG. 1.

First area 1101 includes first substrate 111, first electrode 112, liquid crystal layer 113, second electrode 114, and second substrate 115 sequentially arranged from the rear side (lower side in FIG. 3), as illustrated in FIG. 3.

Second area 1102 includes first substrate 111, first electrode 112, adhesive layer 116, second electrode 114, and second substrate 115 sequentially arranged from the rear side. The components described above are each transparent to visible light.

First substrate 111 is disposed in a rear portion of lens 110 (side facing user) in electronic glasses 100. First substrate 111 is so curved as to protrude toward the front side of electronic glasses 100. The curvature and shape of first substrate 111 can be adjusted as appropriate in accordance with the intended optical power of lens 110.

First substrate 111 has diffraction area 117, which is disposed in an area corresponding to first area 1101. The following portions are formed in diffraction area 117: semi-spherical protruding portion 1171, which is disposed in a central portion of one surface of first substrate 111 (front surface); and a plurality of annular first protruding stripes 1172, which are disposed in an area outside protruding portion 1171.

The shapes of protruding portion 1171 and first protruding stripes 1172 can be adjusted as appropriate in accordance with the intended optical power of electronic glasses 100 that diffract light incident from the front side thereof. Examples of the shapes of protruding portion 1171 and first protruding stripes 1172 may include the shape of a Fresnel lens.

Part of protruding portion 1171 and first protruding stripes 1172 may have the shape of a Fresnel lens, or the entirety of protruding portion 1171 and first protruding stripes 1172 may have the shape of a Fresnel lens.

The material of first substrate 111 is not limited to a specific material and may be any light transmissive material. For example, the material of first substrate 111 can be a known material usable as the material of a lens. Examples of the material of first substrate 111 may include glass and resin.

Specific examples of the resin may include polymethyl methacrylate, polycarbonate, polydiethylene glycol bis aryl carbonate, and polystyrene.

First electrode 112 and second electrode 114 are a pair of transparent electrodes having optical transmittance. First electrode 112 is disposed between first substrate 111 and liquid crystal layer 113. Second electrode 114 is disposed between liquid crystal layer 113 and second substrate 115.

First electrode 112 and second electrode 114 only need to be disposed in a range (first area 1101) where voltage is applicable to at least liquid crystal layer 113.

First electrode 112 and second electrode 114 are not each necessarily made of a specific material and may each be made of a material having intended optical transmittance and electrical conductivity. Examples of the material of first electrode 112 and second electrode 114 may include an indium tin oxide (ITO) and a zinc oxide (ZnO). First electrode 112 and second electrode 114 may be made of the same material or materials different from each other.

Liquid crystal layer 113 is disposed between first electrode 112 and second electrode 114. Liquid crystal layer 113 is so configured that the refractive index thereof changes in accordance with whether or not voltage is applied thereto. For example, the refractive index of liquid crystal layer 113 is so adjusted as to be roughly equal to the refractive indices of first substrate 111 and second substrate 115 in the state in which no voltage is applied to liquid crystal layer 113. On the other hand, the refractive index of liquid crystal layer 113 is so adjusted as to differ from the refractive indices of first substrate 111 and second substrate 115 in the state in which voltage is applied to liquid crystal layer 113.

Liquid crystal layer 113 contains a liquid crystal material. The orientation of the liquid crystal material to which voltage is applied differs from the orientation of the liquid crystal material to which no voltage is applied. The liquid crystal material can be selected as appropriate in accordance with the refractive indices of first substrate 111 and second substrate 115. For example, the liquid crystal material can be made, for example, of a cholesteric or nematic liquid crystal material.

Second substrate 115 is disposed in a front portion of lens 110 in electronic glasses 100. Second substrate 115 is also so curved as to protrude toward the front side of electronic glasses 100. The curvature of second substrate 115 corresponds to curvature of first substrate 111. Examples of the material of second substrate 115 are the same as the examples of the material of first substrate 111.

Adhesive layer 116 is disposed between first substrate 111 and second substrate 115 in second area 1102 and bonds first substrate 111 and second substrate 115 to each other. In a case where first electrode 112 and second electrode 114 are also disposed in second area 1102, adhesive layer 116 is disposed between first electrode 112 and second electrode 114. Adhesive layer 116 also has the function of encapsulating the liquid crystal material that forms liquid crystal layer 113.

Adhesive layer 116 is made of a cured adhesive. The adhesive is not necessarily made of a specific material and may be made of any material that has intended optical transmittance and allows first substrate 111 and second substrate 115 to be appropriately bonded to each other. An adhesive having an intended refractive index can be selected from the viewpoint of adjustment of the optical power of the lens 110.

The lens 110 may further include other constituent elements having optical transmittance as required. Examples of the other constituent elements may include an insulating layer and an orientation film.

The insulating layer prevents conduction between first electrode 112 and second electrode 114. For example, the insulating layer is disposed between first electrode 112 and liquid crystal layer 113 and between liquid crystal layer 113 and second electrode 114. The insulating layer can be made of a known material usable as an insulating layer having optical transmittance. Examples of the material of the insulating layer may include silicon dioxide.

The orientation film controls the orientation of the liquid crystal material in liquid crystal layer 113. For example, the orientation film is disposed between first electrode 112 and liquid crystal layer 113 and between liquid crystal layer 113 and second electrode 114. The orientation film can be made of a known material usable as an orientation film for a liquid crystal material. Examples of the material of the orientation film may include a polyimide.

The lens 110 can be manufactured, for example, by using the following manufacturing method. First substrate 111 and second substrate 115 are first prepared. First substrate 111 and second substrate 115 can be manufactured, for example, in injection molding.

Thereafter, first electrode 112 is formed on first substrate 111, and second electrode 114 is formed on second substrate 115. Examples of a method for forming first electrode 112 on first substrate 111 and a method for forming second electrode 114 on second substrate 115 may include vacuum evaporation and sputtering.

Thereafter, a liquid crystal material is provided on diffraction area 117 of first substrate 111 on which first electrode 112 has been formed, and an adhesive is provided on a portion of first substrate 111 that is the portion excluding diffraction area 117. Second substrate 115 on which second electrode 114 has been formed is disposed on first substrate 111 with the liquid crystal material and the adhesive disposed on first substrate 111. Finally, the adhesives are hardened. The lens 110 can thus be manufactured.

(Front Portion)

Front portion 130 holds the pair of lenses 110, as illustrated in FIG. 1. Front portion 130 includes a pair of rims 131, which support the pair of lenses 110, respectively, and a bridge 132, which connects the pair of rims 131 to each other in the width direction. Rims 131 have shapes corresponding to the shapes of lenses 110.

Bridge 132 includes a pair of nose pads 133, which can come into contact with the user's nose. Although not illustrated, a wire that electrically connects first electrode 112 of lens 110 to controller 160, which will be described later, and a wire that electrically connects second electrode 114 of lens 110 to controller 160 are disposed in front portion 130.

Front portion 130 is not necessarily made of a specific material. Front portion 130 can be made of a known material used as the material of a front portion of glasses. Examples of the material of front portion 130 may include polyamide, acetate, carbon, celluloid, polyetherimide, and urethane.

(Temples)

Temples 140 will be described below with reference to FIGS. 4 to 16B. In the following description of temples 140 and each member that forms temples 140, the outer surface of electronic glasses 100 in the width direction is simply referred to as an "outer surface." On the other hand, in the description of temples 140 and each member that forms temples 140, the inner surface of electronic glasses 100 in the width direction is simply referred to as an "inner surface." The width direction with respect to temples 140 is also the thickness direction of temples 140. The thickness dimension of temples 140 is therefore also the dimension of temples 140 in the width direction. The upward/downward direction with respect to temples 140 is also the height direction of temples 140. The height dimension of temples 140 is therefore also the dimension of temples 140 in the upward/downward direction.

In the following description, temple 140 on the right side (temple disposed on the right of the user wearing electronic glasses 100) out of the pair of temples 140 will be described. The constituent elements of temple 140 on the left side (temple disposed on the left of the user wearing electronic glasses 100) may be the same as the constituent elements of right-side temple 140 (that is, temples 140 are bilaterally symmetric in rightward/leftward direction) or may differ therefrom.

The same components of left-side temple 140 as those of left-side temple 140 have the same reference characters and will not be described. The configuration of right-side temple 140, which will be described below, is applicable as appropriate to left-side temple 140.

A front end portion of temple 140 is connected to front portion 130, as illustrated in FIG. 1. For example, temple 140 engages with rim 131 of front portion 130 in such a way that temple 140 is rotatable around an axis in a predetermined direction (upward/downward direction, for example).

An overview of temple 140 according to the present embodiment will first be described with reference to FIG. 10. Temple 140 (also referred to as frame component) according to the present embodiment forms the frame of an eyewear. Thus functioning temple 140 includes housing 141, which has an outer surface (also referred to as first surface) on which outer recessed portion 141$f$ (also referred to as first recessed portion) is formed, and outer through hole 141g (also referred to as first hole), which opens to outer recessed portion 141f, contact receiving portion 142 (also referred to as first device), which is disposed in outer recessed portion 141f, and connection member 101 (also referred to as fastening member), which is inserted through outer through hole 141g and fixes contact receiving portion 142 to housing 141.

Thus configured temple 140 specifically includes housing 141, contact receiving portion 142, detection section 145, light source 102, light guiding member 103, side portion cover 104, adhesive member 105, and front end portion cover 146, as illustrated in FIGS. 8 to 11. The members that form temple 140 will be described below.

(Housing)

Figure 4:
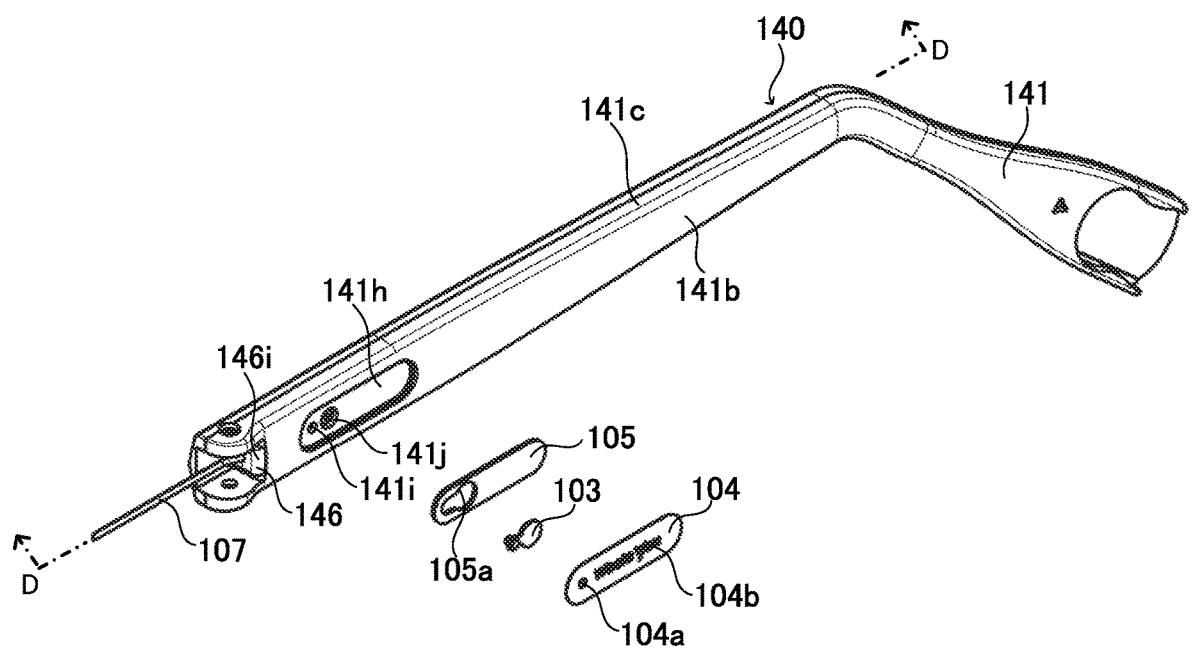
FIG. 4 is an exploded perspective view of a temple viewed from the widthwise inner side of the electronic glasses.
Figure 5A:
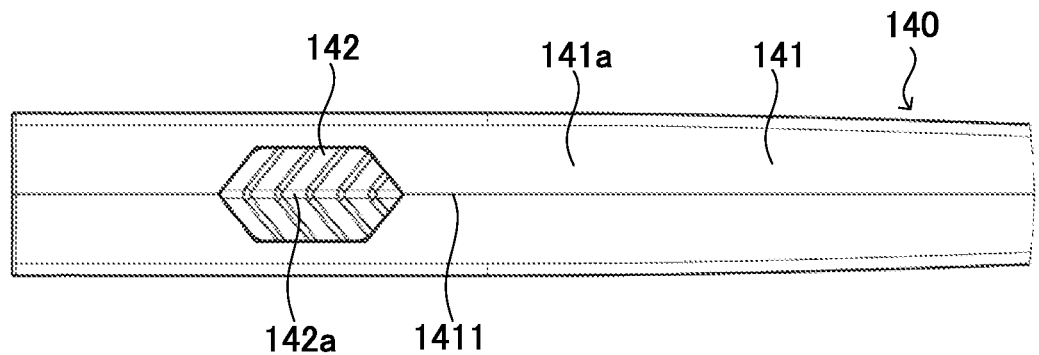
FIG. 5A illustrates the outer surface of the temple.
Figure 5B:
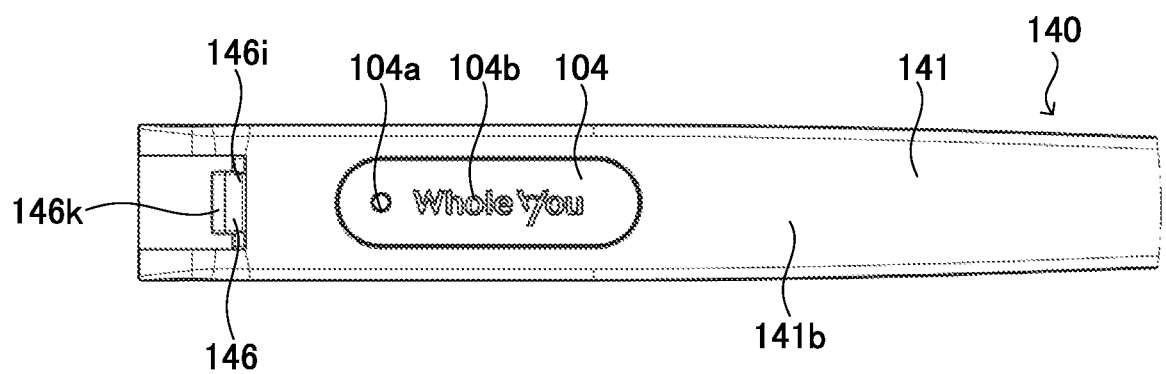
FIG. 5B illustrates the inner surface of the temple.

Housing 141 forms the outer shape of temple 140, as illustrated in FIG. 4. Housing 141 has accommodation space 141e (see FIG. 10), which accommodates detection section 145. Housing 141 extends along one direction (specifically, frontward/rearward direction). Accommodation space 141e corresponds to an example of an accommodation portion.

Figure 11:
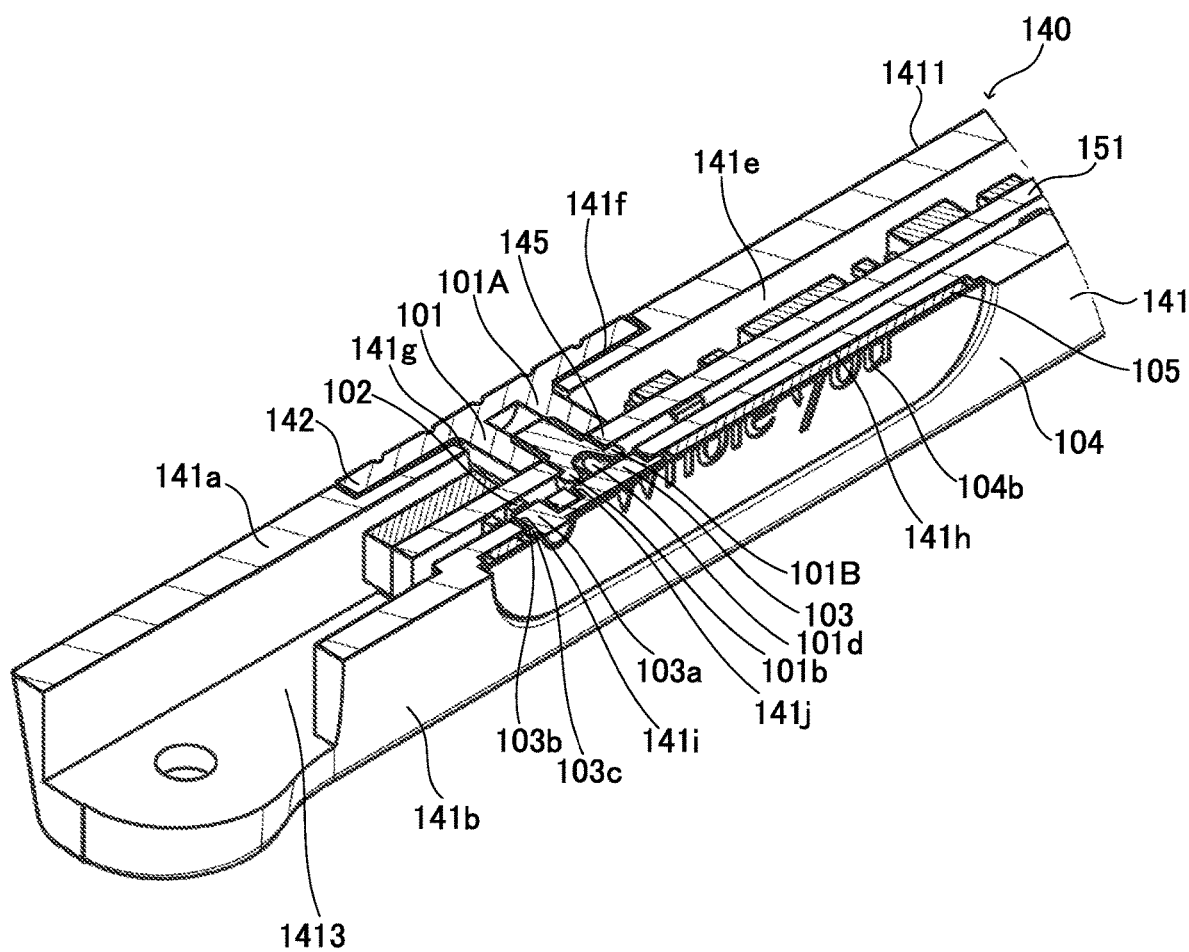
FIG. 11 is a cross-sectional perspective view of the portion corresponding to portion X in FIG. 8.
Figure 12A:
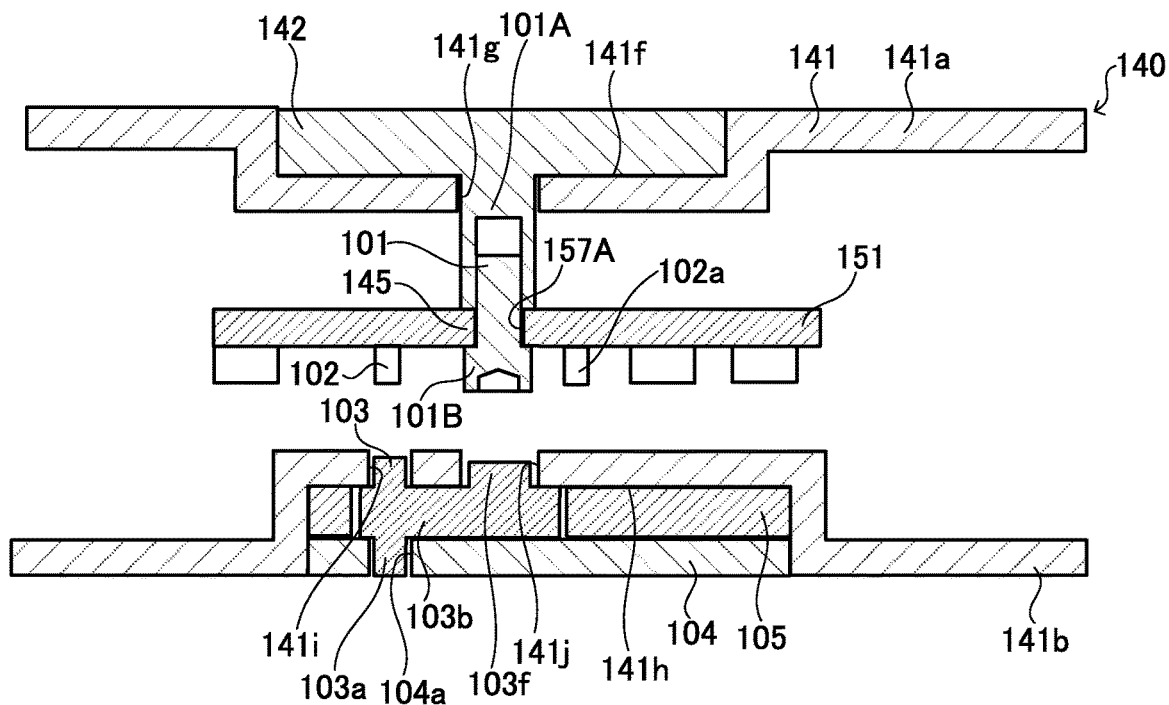
FIG. 12A is a cross-sectional diagrammatic view of the portion corresponding to portion X in FIG. 8.
Figure 12B:
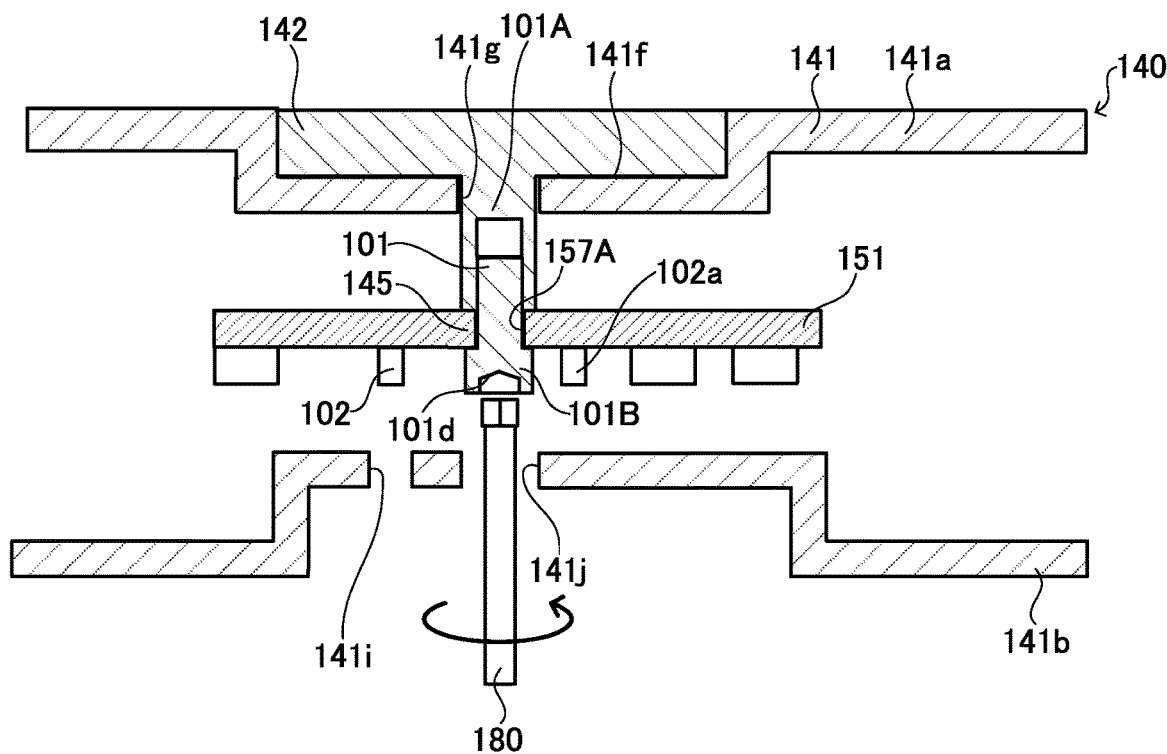
FIG. 12B is a cross-sectional diagrammatic view for describing a method for fixing a contact receiving portion to the housing via a connection member.

A front end portion of housing 141 has first opening portion 1413 (see FIG. 11). On the other hand, a rear end portion of housing 141 has a second opening portion (not illustrated). Power supply 170 is detachably disposed in the second opening portion (see FIG. 1).

Thus configured housing 141 includes outer wall portion 141a (see FIG. 8), which is provided on the outer side in the width direction, and inner wall portion 141b, which is shifted inward (lower side in FIG. 10) from outer wall portion 141a in the width direction. Outer wall portion 141a and inner wall portion 141b face each other in the width direction.

In the present embodiment, second protruding stripe 1411 (see FIG. 5A), which extends along the longitudinal direction of housing 141, is formed on the outer surface of outer wall portion 141a of housing 141. A central portion of the outer surface of outer wall portion 141a that is a central portion in the transverse direction (also referred to as upward/downward direction) is located on the ridge of second protruding stripe 1411. On the other hand, the inner surface of inner wall portion 141b is a flat surface.

Figure 6A:
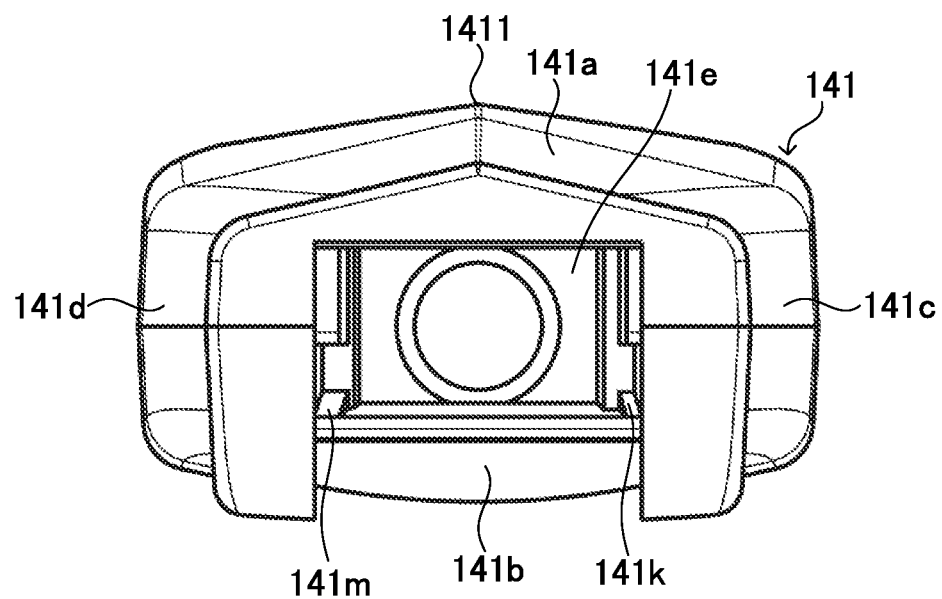
FIG. 6A illustrates the front end surface of the temple viewed when only a housing is viewed from the front.
Figure 6B:
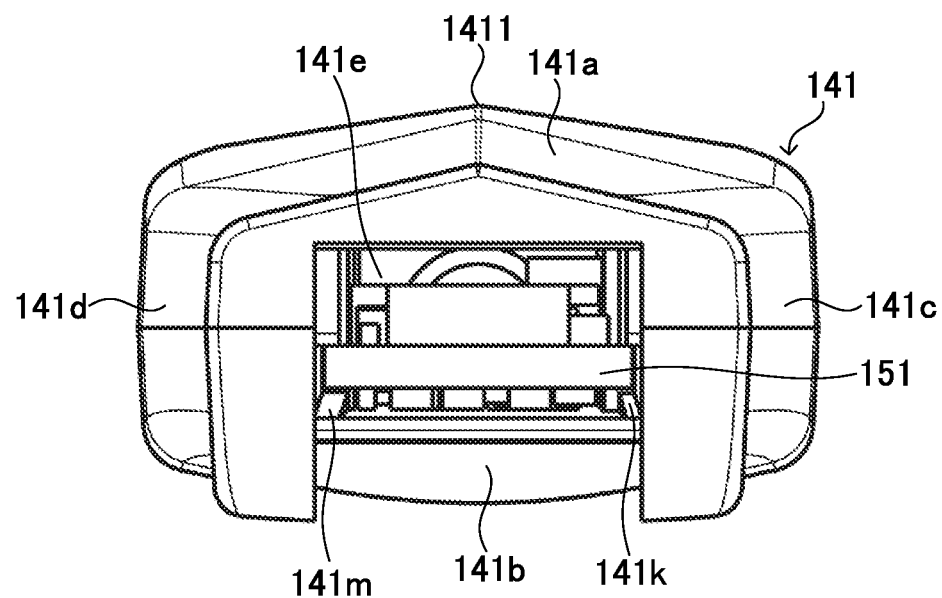
FIG. 6B illustrates the front end surface viewed when the housing in which a substrate is assembled is viewed from the front.

An upper end portion of outer wall portion 141a and an upper end portion of inner wall portion 141b are continuous with each other in the width direction via upper wall portion 141c (see FIGS. 6A and 6B). On the other hand, a lower end portion of outer wall portion 141a and a lower end portion of inner wall portion 141b are continuous with each other in the width direction via lower wall portion 141d (see FIGS. 6A and 6B). Upper wall portion 141c and lower wall portion 141d face each other in the upward/downward direction (thickness direction). The space surrounded by outer wall portion 141a, inner wall portion 141b, upper wall portion 141c, and lower wall portion 141d is accommodation space 141e of housing 141.

Figure 8:
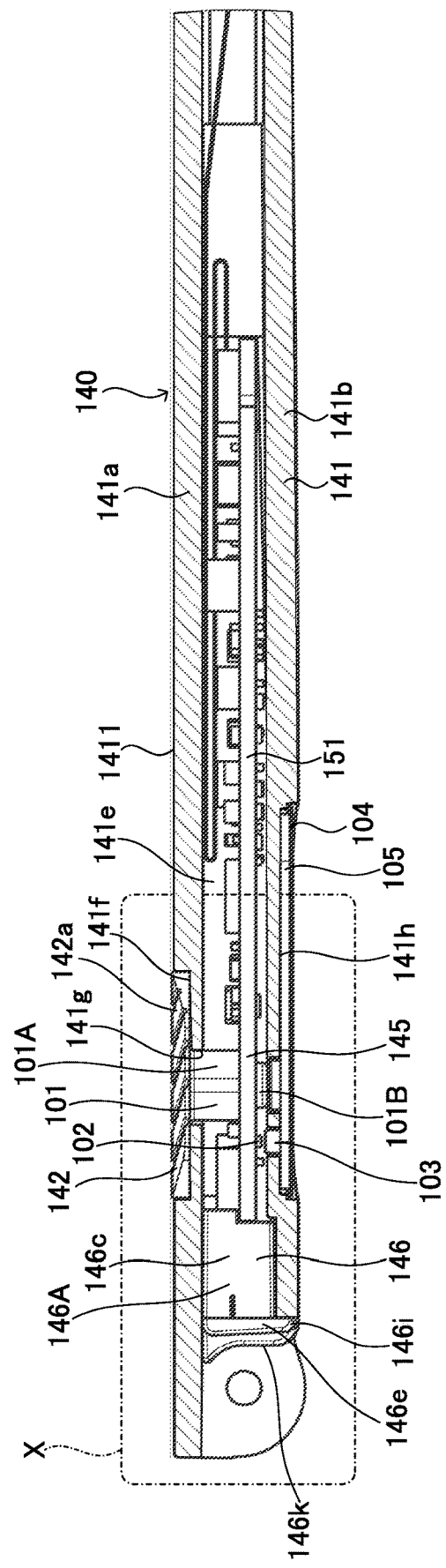
FIG. 8 is a partial cross-sectional view of the temple illustrated in FIG. 4 with only the housing taken along the line D-D.

The outer surface (also referred to as first surface) of outer wall portion 141a includes outer recessed portion 141f (also referred to as first recessed portion, see FIG. 8). Outer recessed portion 141f has a roughly hexagonal shape when viewed from a location outside temple 140 in the width direction. A bottom portion of outer recessed portion 141f has outer through hole 141g (also referred to as first hole). Outer through hole 141g passes through the bottom portion of outer recessed portion 141f to the inner surface of outer wall portion 141a. Outer connection member 101A of connection member 101, which will be described later, is inserted through thus configured outer through hole 141g.

The inner surface (also referred to as second surface) of inner wall portion 141b includes inner recessed portion 141h (also referred to as second recessed portion). Inner recessed portion 141h has an oval shape elongated in the longitudinal direction (also referred to as frontward/rearward direction) of housing 141 when viewed from a location inside temple 140 in the width direction.

Thus configured inner recessed portion 141h at least partially overlaps with (faces) outer recessed portion 141f of outer wall portion 141a in the width (thickness) direction. In the present embodiment, the length of inner recessed portion 141h in the frontward/rearward direction is greater than the length of outer recessed portion 141f in the frontward/rearward direction.

A bottom portion of inner recessed portion 141h has first inner through hole 141i (also referred to as holding portion). First inner through hole 141i passes through the bottom portion of inner recessed portion 141h to the outer surface of inner wall portion 141b (upper surface in FIG. 10). Part of light guiding main portion 103a of light guiding member 103, which will be described later, is inserted into thus configured first inner through hole 141i.

Inner recessed portion 141h has second inner through hole 141j (also referred to as second hole) located in a position separate from first inner through hole 141i. Second inner through hole 141j passes through the bottom portion of inner recessed portion 141h to the outer surface of inner wall portion 141b (upper surface FIG. 10). Second inner through hole 141j at least partially overlaps with outer through hole 141g of outer wall portion 141a in the width direction. In the present embodiment, the center axis of second inner through hole 141j coincides with the center axis of outer through hole 141g.

Second inner through hole 141j is a hole that causes at least part of connection member 101 (specifically, inner connection member 101B) to be disposed in accommodation space 141e of housing 141. Second inner through hole 141j is also a hole that causes inner connection member 101B to engage with outer connection member 101A of connection member 101.

Specifically, second inner through hole 141j has an inner diameter that allows inner connection member 101B of connection member 101, which will be described later, to pass through second inner through hole 141j from the inner side in the width direction to the outer side in the width direction (from below to above in FIG. 10). Further, second inner through hole 141j has an inner diameter that allows tool 180 (see FIG. 12B), which causes inner connection member 101B to engage with (screw to in present embodiment) outer connection member 101A of connection member 101, to be inserted into second inner through hole 141j. Positioning protruding portion 103f of light guiding member 103, which will be described later, is disposed in thus configured second inner through hole 141j in assembled electronic glasses 100.

Figure 15A:
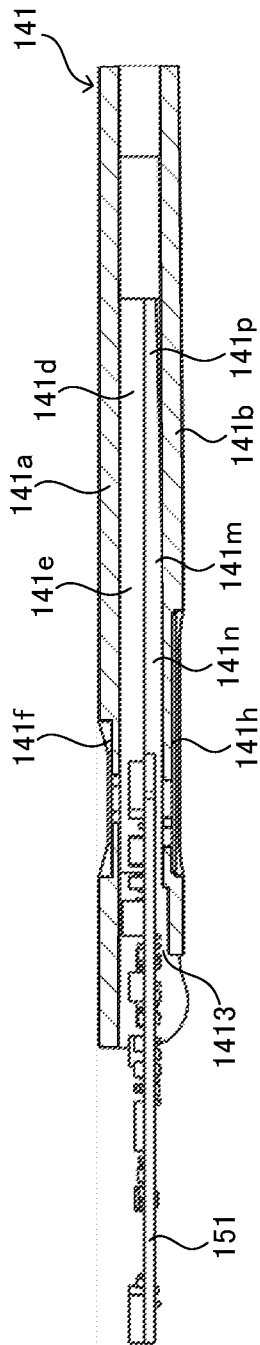
FIG. 15A is a cross-sectional view illustrating an intermediate state of insertion of the substrate into the housing.
Figure 15B:
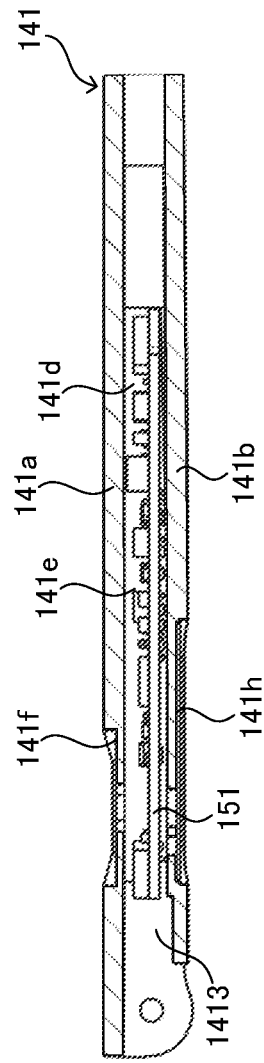
FIG. 15B is a cross-sectional view illustrating the state in which the substrate has been inserted into the housing.
Figure 16A:
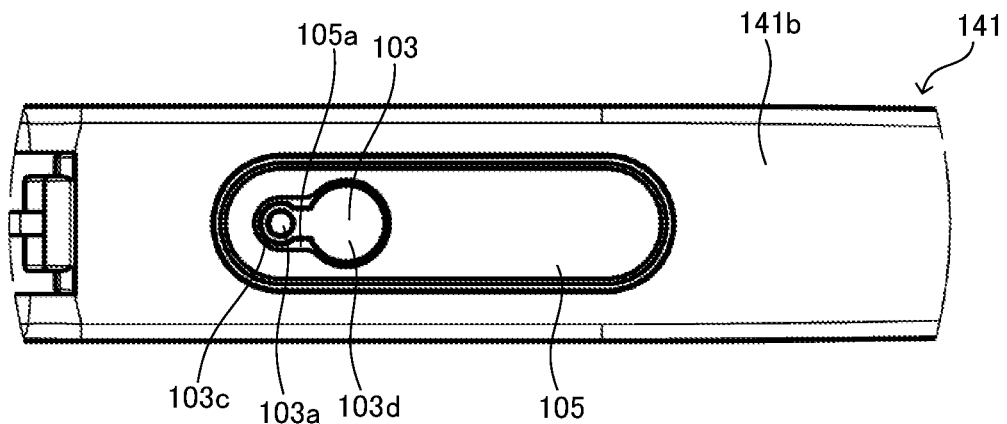
FIG. 16A is a partial plan view illustrating the state in which a bonding member has been assembled to the housing.
Figure 16B:
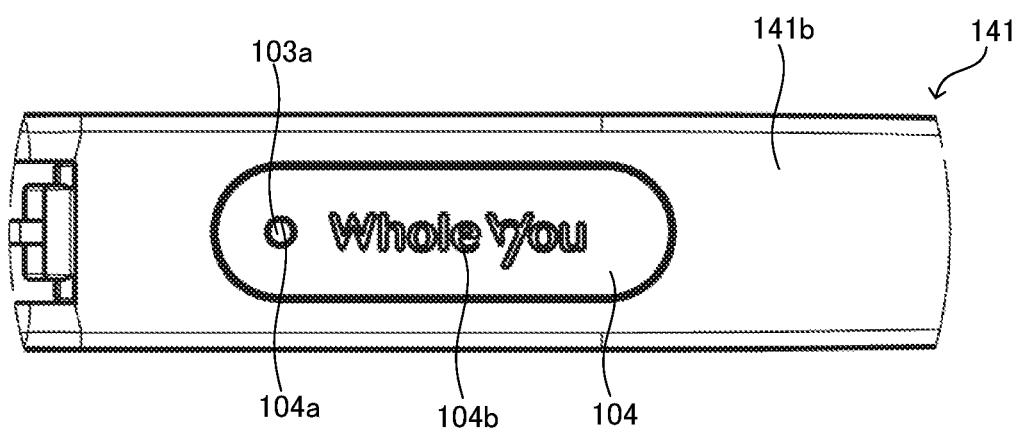
FIG. 16B is a partial plan view illustrating the state in which a side portion cover has been assembled to the housing.

The inner surface of housing 141 includes first guiding groove 141k and second guiding groove 141m (see FIGS. 6A, 6B, and 15A). First guiding groove 141k and second guiding groove 141m each serve as a guide in the operation of placing substrate 151, which will be described later, in accommodation space 141e of housing 141.

Specifically, housing 141 includes first guiding groove 141k in the inner surface (also referred to as lower surface) of upper wall portion 141c and second guiding groove 141m in the inner surface (also referred to as upper surface) of lower wall portion 141d.

First guiding groove 141k and second guiding groove 141m each extend in the frontward/rearward direction and have an opening at the front end. The length of first guiding groove 141k and second guiding groove 141m in the frontward/rearward direction is smaller than the length of substrate 151, which will be described later, in the frontward/rearward direction.

The width of a rear end portion of each of first guiding groove 141k and second guiding groove 141m is smaller than the width of a front end portion thereof. Specifically, first guiding groove 141k and second guiding groove 141m each include parallel groove portion 141n (see FIG. 15A), the width of which does not change in the frontward/rearward direction, and inclining groove portion 141p (see FIG. 15A), which is shifted rearward from parallel groove portion 141n.

The width of inclining groove portion 141p decreases with distance to the rear end. Thus configured first guiding groove 141k and second guiding groove 141m engage in the upward/downward direction with end portions of substrate 151 that are the end portions in the transverse direction (also referred to as upward/downward direction) to guide the displacement of substrate 151 in the longitudinal direction thereof (also referred to as frontward/rearward direction).

Housing 141 is not necessarily made of a specific material. Housing 141 can be made of a known material used as the material of the temples of glasses. Examples of the material of housing 141 are the same as the examples of the material of front portion 130. It is, however, noted that in a case where housing 141 is made of a metal material, a portion of housing 141 that is a portion located around contact receiving portion 142, which will be described later, and comes (or can come) into contact with contact receiving portion 142 is made of a non-metal material, such as resin.

(Contact Receiving Portion)

Contact receiving portion 142 (also referred to as first device) is, for example, a member that forms part of a touch sensor and a portion with which a target object, such as a finger of the user of electronic glasses 100, can come into contact. To this end, at least of part of contact receiving portion 142 is so disposed as to be exposed to a point out of housing 141.

Examples of the material of contact receiving portion 142 may include a metal material having electrical conductivity, such as gold, silver, copper, aluminum, iron, or an alloy thereof. The contact of a target object that is an electrical conductor with contact receiving portion 142 is electrically transmitted to detection section 145, which will be described later. The path along which the contact is transmitted will be described later.

In the present embodiment, contact receiving portion 142 is disposed in outer recessed portion 141f. In this state, the outer surface of contact receiving portion 142 is so exposed to a point out of housing 141 that the user's finger is contactable with the outer surface.

Specifically, contact receiving portion 142 has a roughly hexagonal shape when externally viewed in the width direction, and the hexagonal shape is slightly smaller than the shape of the outer edge of outer recessed portion 141f viewed in the same direction. A portion of the outer surface of contact receiving portion 142 that is a central portion in the transverse direction of housing 141 includes contact-receiving-portion-side stripe 142a (see FIG. 5A), which extends in the longitudinal direction of housing 141. In the present embodiment, contact-receiving-portion-side stripe 142a is disposed on an extension of the ridge of second protruding stripe 141l.

The outer surface of thus configured contact receiving portion 142 is flush with the portions present on the outer surface of housing 141 around outer recessed portion 141f. It is, however, noted that the outer surface of contact receiving portion 142 may instead protrude outward in the width direction beyond the portions present on the outer surface of housing 141 around outer recessed portion 141f (specifically outer wall portion 141a). The inner surface of contact receiving portion 142 is in contact with the bottom portion of outer recessed portion 141f.

The inclination of the outer surface of contact receiving portion 142 toward the inner side (rearward in FIG. 5A) in the width direction increases as the distance from contact-receiving-portion-side stripe 142a to opposite sides of housing 141 in the transverse direction thereof (upward/downward direction in FIG. 5A) increases. Outer connection member 101A of connection member 101, which will be described later, is so provided on the inner surface of contact receiving portion 142 as to be integrated with contact receiving portion 142.

The position of contact receiving portion 142 is preferably a position where the user of electronic glasses 100 readily touches contact receiving portion 142. From the viewpoint described above, contact receiving portion 142 is preferably so disposed as to be shifted forward from the middle point of housing 141 in the longitudinal direction, more preferably, in the foremost portion out of three portions into which housing 141 is equally divided in the longitudinal direction.

(Detection Section)

Figure 14:
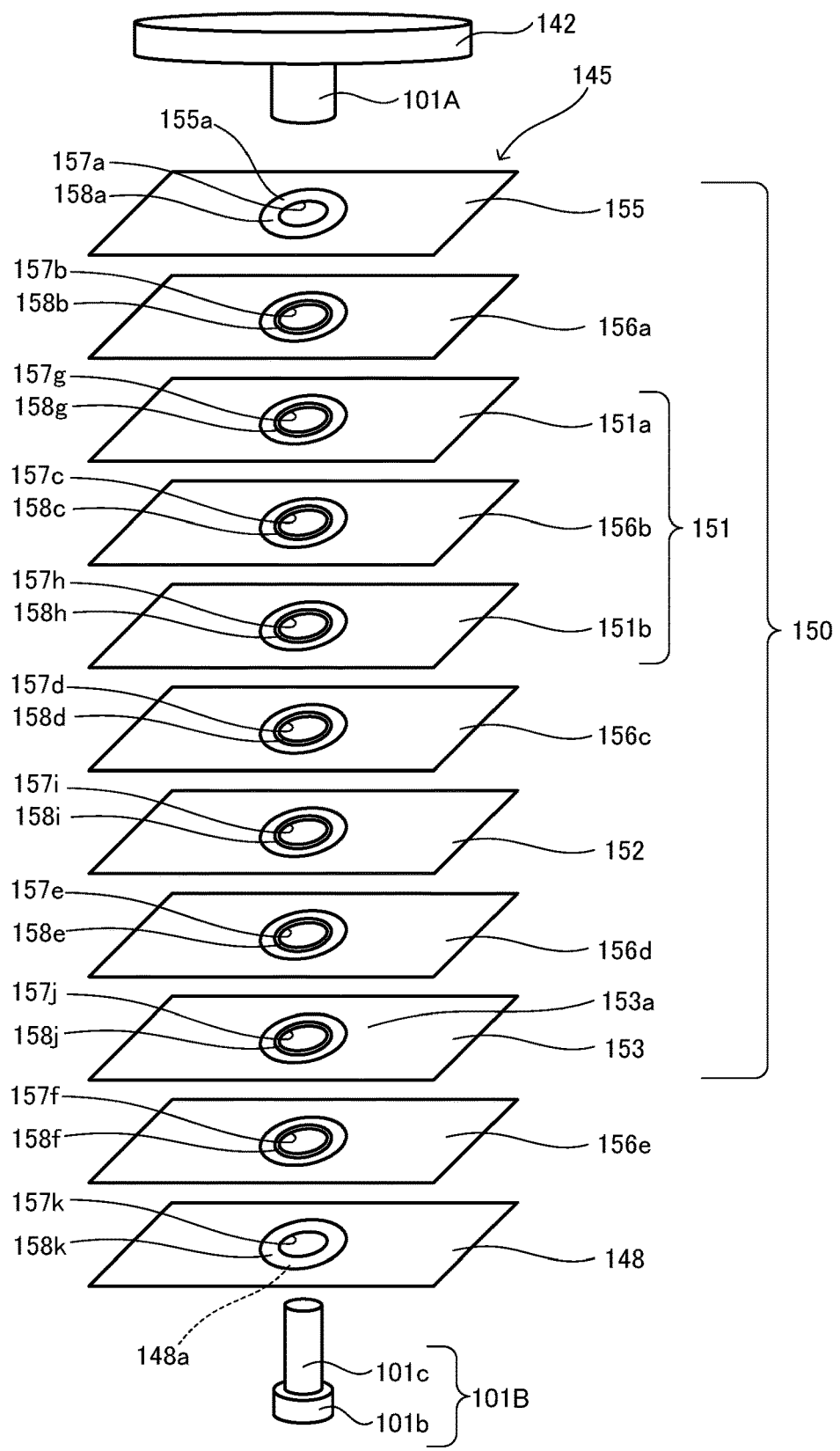
FIG. 14 is a diagrammatic view illustrating the structure of a detection section.

FIG. 14 is a diagrammatic view for describing the configuration of detection section 145. Detection section 145 is disposed in accommodation space 141e of housing 141 and electrically connected to contact receiving portion 142. Detection section 145 experiences a change in capacitance resulting from the contact between the target object and contact receiving portion 142.

Detection section 145 has through hole 157A (see FIG. 10), which passes through the outer surface to the inner surface of detection section 145. In the present embodiment, the center axis of through hole 157A coincides with the center axes of second inner through hole 141j and outer through hole 141g. Detection section 145 further includes conduction portion 158A (see FIG. 10), which conducts electricity from the outer surface to the inner surface, on the inner circumferential surface of through hole 157A.

Specifically, detection section 145 has a laminate structure in which a plurality of layers are laminated on each other, as illustrated in FIG. 14. Specifically, detection section 145 includes outer plate-shaped member 155, insulating layer 156a, substrate 151 (outer substrate 151a, insulating layer 156b, and inner substrate 151b), insulating layer 156c, second grounded portion 152, insulating layer 156d, detection pad 153, insulating layer 156e, and electrically conductive plate 148 sequentially arranged from the outer side (upper side in FIG. 14) in the width direction.

In the present embodiment, outer plate-shaped member 155, insulating layer 156a, outer substrate 151a, insulating layer 156b, inner substrate 151b, insulating layer 156c, second grounded portion 152, insulating layer 156d, and detection pad 153 form laminate for detection 150. Laminate for detection 150 detects a change in capacitance that occurs when the target object comes into contact with contact receiving portion 142.

Outer plate-shaped member 155 is a plate-shaped member made, for example, of metal, ceramic, or synthetic resin. Outer plate-shaped member 155 includes through hole element 157a, which passes through outer plate-shaped member 155 from the outer surface to the inner surface thereof. Outer plate-shaped member 155 includes annular conduction portion 158a around and along the circumferential edge of through hole element 157a. Conduction portion 158a is made, for example, of an electrically conductive metal, such as gold, silver, and copper.

Conduction portion 158a includes outer conduction portion 155a (see FIG. 14), which is disposed on the outer surface of outer plate-shaped member 155. Outer conduction portion 155a is in contact with the front end surface (inner end surface in width direction) of outer connection member 101A, which will be described later. In the present embodiment, the outer diameter of outer conduction portion 155a is greater than the outer diameter of the front end surface of outer connection member 101A.

The configuration described above causes the front end surface of outer connection member 101A to be reliably in contact with outer conduction portion 155a. As a result, outer connection member 101A and conduction portion 158a are reliably electrically connected to each other. On the other hand, a portion of conduction portion 158a that is the portion disposed on the inner surface of outer plate-shaped member 155 is continuous with conduction portion 158b of insulating layer 156a.

Insulating layers 156a to 156e are each formed of an insulator. Insulating layers 156a to 156e may each have a single layer structure or a laminate structure. Examples of the material of insulating layers 156a to 156e may include silicon dioxide and silicon nitride. Insulating layers 156a to 156e include through hole elements 157b to 157f, which pass therethrough in the width direction.

Insulating layers 156a to 156e include annular conduction portions 158b to 158f around and along the circumferential edges of through hole elements 157b to 157f, respectively. Conduction portions 158b to 158f are made, for example, of an electrically conductive metal, such as gold, silver, and copper.

Substrate 151 includes outer substrate 151a, insulating layer 156b, and inner substrate 151b sequentially arranged from outer side of substrate 151 in the width direction. Thus configured substrate 151 supports each element that forms detection section 145. Substrate 151 is, for example, a printed board on which controller 160 (see FIG. 2) is mounted. Also in the present embodiment, controller 160 is so connected to detection pad 153 as to be capable of receiving the result of the detection of a change in capacitance in detection pad 153.

In the present embodiment, substrate 151 is so disposed in detection section 145 as to be shifted outward from electrically conductive plate 148, insulating layer 156e, and detection pad 153 in the width direction (upper side in FIG. 14).

Outer substrate 151a and inner substrate 151b include through hole elements 157g and 157h, respectively, which pass through outer substrate 151a and inner substrate 151b in the width direction. The combination of through hole element 157g of outer substrate 151a, through hole element 157h of inner substrate 151b, and through hole element 157c of insulating layer 156b is a substrate-side through hole.

Outer substrate 151a and inner substrate 151b include annular conduction portions 158g and 158h around and along the circumferential edges of through hole elements 157g and 157h, respectively. Conduction portions 158g and 158h are made, for example, of an electrically conductive metal, such as gold, silver, and copper.

Second grounded portion 152 is disposed between substrate 151 and detection pad 153 via insulating layers 156c and 156d. Second grounded portion 152 protects detection pad 153 from noise. A non-intended change in the capacitance can thus be suppressed. In the present embodiment, second grounded portion 152 preferably has a mesh shape also from the viewpoint of reduction in parasitic capacity between detection pad 153 and second grounded portion 152.

Second grounded portion 152 includes through hole element 157i, which passes therethrough in the width direction. Second grounded portion 152 includes annular conduction portion 158i around and along the circumferential edge of through hole elements 157i. Conduction portion 158i is made, for example, of an electrically conductive metal, such as gold, silver, and copper.

Detection pad 153 is a capacitance-based detection pad that detects a change in capacitance resulting from the contact between the target object and contact receiving portion 142. Detection pad 153 can be a known detection pad usable as a touch sensor.

Detection pad 153 includes through hole element 157j, which passes through detection pad 153 in the width direction. Detection pad 153 includes annular conduction portion 158j around and along the circumferential edge of through hole element 157j. Conduction portion 158j is made, for example, of an electrically conductive metal, such as gold, silver, and copper. Conduction portion 158j is not connected to detection area 153a (see FIG. 14), which is part of detection pad 153 and present around conduction portion 158j.

Electrically conductive plate 148 is disposed on a surface of insulating layer 156e that is the inner surface in the width direction. Specifically, electrically conductive plate 148 is so disposed as to face detection area 153a of detection pad 153 with insulating layer 156e sandwiched between electrically conductive plate 148 and detection pad 153. In the present embodiment, electrically conductive plate 148 is disposed in a position shifted from contact receiving portion 142 by a greater amount than laminate for detection 150 (specifically, detection pad 153).

Electrically conductive plate 148 includes through hole element 157k, which passes therethrough in the width direction. Electrically conductive plate 148 includes annular conduction portion 158k around and along the circumferential edge of through hole element 157k. Conduction portion 158k is made, for example, of an electrically conductive metal, such as gold, silver, and copper.

Conduction portion 158k includes inner conduction portion 148a (see FIG. 14) disposed on a surface of the electrically conductive plate 148 that is the inner surface in the width direction. Inner conduction portion 148a is in contact with head portion 101b of inner connection member 101B.

In the present embodiment, the outer diameter of inner conduction portion 148a is greater than the outer diameter of head portion 101b of inner connection member 101B. The configuration described above causes the head portion 101b of inner connection member 101B to be reliably in contact with inner conduction portion 148a. As a result, the inner connection member 101B and conduction portion 158k are reliably electrically connected to each other.

The above-mentioned members that form detection section 145 are laminated on each other in the width direction, and the center axes of through hole elements 157a to 157k are located along the same axis. The through hole elements 157a to 157k form through hole 157A of detection section 145.

Thus configured through hole 157A passes through detection section 145 from the outer surface to the inner surface thereof. In the present embodiment, the outer surface of detection section 145 is the outer surface of outer plate-shaped member 155. On the other hand, the inner surface of detection section 145 is the inner surface of electrically conductive plate 148.

Of conduction portions 158a to 158k, conduction portions adjacent to each other in the width direction are electrically connected to each other. Conduction portion 158a, which is disposed in the outermost position in the width direction, is thus electrically connected to conduction portion 158k, which is disposed in the innermost position in the width direction. Conduction portions 158a to 158k form conduction portion 158A of detection section 145.

(Connection Member)

Connection member 101 (also referred to as fastening member) is electrically conductive and electrically connects contact receiving portion 142 to detection section 145. Further, connection member 101 fixes contact receiving portion 142 to substrate 151 in detection section 145. Connection member 101 thus fixes contact receiving portion 142 to housing 141. In the present embodiment, contact receiving portion 142 and detection section 145 are electrically connected to each other via a first conduction path and a second conduction path, which will be described later.

Specifically, connection member 101 includes outer connection member 101A and inner connection member 101B. Outer connection member 101A is a fastening member, such as a nut, and is provided on the inner surface of contact receiving portion 142. Outer connection member 101A is a tubular member having a front end side (lower end side in FIG. 10) that opens, and at least part of the inner circumferential surface of outer connection member 101A is provided with outer engagement portion 101a (see FIG. 10).

The base end (upper end in FIG. 10) of outer connection member 101A is fixed to and integrated with the inner surface of contact receiving portion 142. Thus configured outer connection member 101A is inserted through outer through hole 141g of housing 141 from the outside in the width direction.

Figure 10:
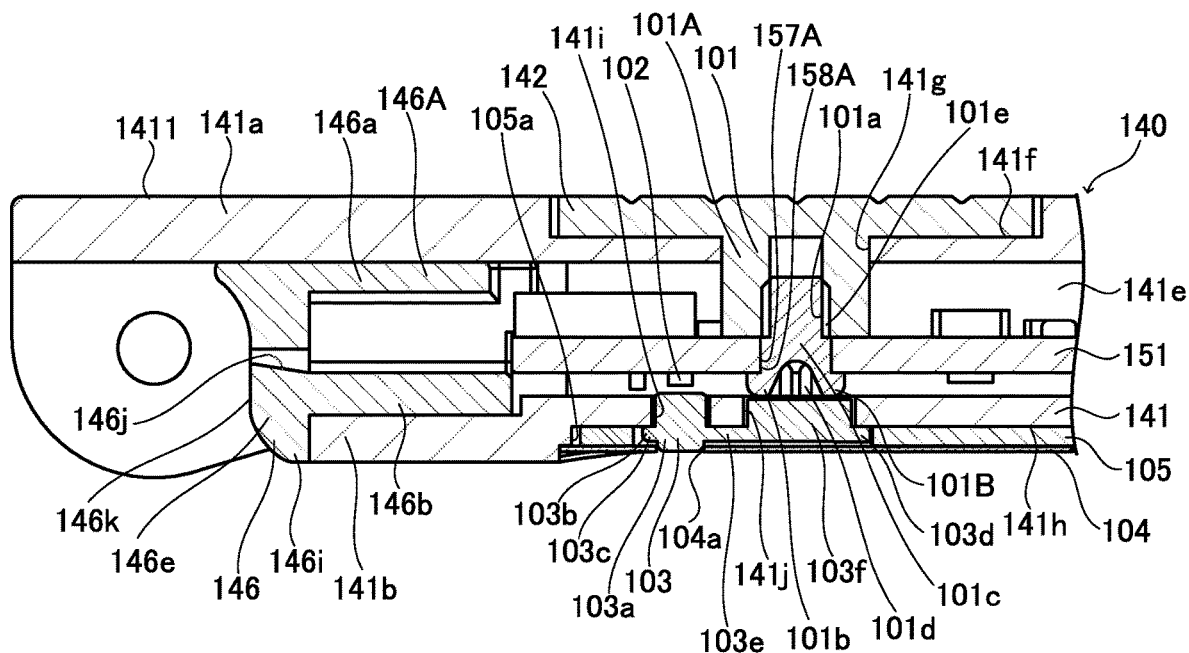
FIG. 10 is a cross-sectional view of a portion corresponding to portion X in FIG. 8.

In this state, the front end surface of outer connection member 101A is in contact with a first end portion (outer end portion in the width direction and upper end portion in FIG. 10) of conduction portion 158A of detection section 145. Specifically, the front end surface of outer connection member 101A is in contact with outer conduction portion 155a of outer plate-shaped member 155 in detection section 145.

Inner connection member 101B is a fastening member, such as a screw and a bolt. At least part (entirety in present embodiment) of inner connection member 101B has an outer diameter that allows inner connection member 101B to be inserted through second inner through hole 141j. Thus configured inner connection member 101B is caused to pass through second inner through hole 141j from the inner side in the width direction to the outer side in the width direction (from below to above in FIG. 10), so that the inner connection member 101B is disposed in accommodation space 141e of housing 141.

Inner connection member 101B includes head portion 101b and shaft portion 101c. One end surface (lower end surface in FIG. 10) of head portion 101b in the width direction is provided with engagement portion 101d, with which tool 180 (see FIG. 12B), such as a screw driver and hexagonal wrench, can engage.

Head portion 101b has, for example, a circular outer shape. Head portion 101b may instead have, for example, hexagonal or any other polygonal outer shape. In this case, engagement portion 101d of head portion 101b may be omitted.

Shaft portion 101c is a solid shaft member, and the outer circumferential surface of shaft portion 101c is provided with inner engagement portion 101e (see FIG. 10). Shaft portion 101c has an outer diameter that allows shaft portion 101c to be inserted through through hole 157A (of substrate 151) of detection section 145. Thus configured shaft portion 101c is inserted through through hole 157A of detection section 145 from the inner side in the width direction.

In this state, inner engagement portion 101e of shaft portion 101c engages with outer engagement portion 101a of outer connection member 101A. Outer connection member 101A and inner connection member 101B are thus fastened to each other and electrically connected to each other.

In the state in which outer connection member 101A and inner connection member 101B are fastened to each other, head portion 101b of inner connection member 101B is in contact with a second end portion (inner end portion in width direction and lower end portion in FIG. 10) of conduction portion 158A of detection section 145. Specifically, head portion 101b of inner connection member 101B is in contact from the inner side in the width direction with inner conduction portion 148a (see FIG. 14) of electrically conductive plate 148 of detection section 145.

As described above, outer connection member 101A is in contact with the first end portion of conduction portion 158A of detection section 145, and inner connection member 101B is in contact with the second end portion of conduction portion 158A of detection section 145, whereby contact receiving portion 142 and electrically conductive plate 148 of detection section 145 are electrically continuous with each other via the following first and second conductive paths.

In the present embodiment, the outer surface of electrically conductive plate 148 is electrically connected to contact receiving portion 142 via the first conductive path. On the other hand, the inner surface of electrically conductive plate 148 is electrically connected to contact receiving portion 142 via the second conductive path.

The first conductive path is a path that connects contact receiving portion 142 and electrically conductive plate 148 of detection section 145 to each other via through hole 157A. Specifically, the first conductive path is formed of contact receiving portion 142, outer connection member 101A, conduction portion 158A of detection section 145, and electrically conductive plate 148 in the order presented.

On the other hand, the second conductive path is a path that connects contact receiving portion 142 and electrically conductive plate 148 of detection section 145 to each other via connection member 101 (specifically, portion where outer connection member 101A and inner connection member 101B engage with each other). Specifically, the second conductive path is formed of contact receiving portion 142, outer connection member 101A, inner connection member 101B, and electrically conductive plate 148 in the order presented.

(Light Source)

Light source 102 (see FIG. 10) emits light in a light emission pattern according to the state of electronic glasses 100. Light source 102, for example, emits light (illuminates) when electronic glasses 100 are in operation (ON state) and does not illuminate when electronic glasses 100 are not in operation (OFF state). Light source 102 may be referred to as a first light source.

Light source 102 is, for example, a light emitting diode (LED). Thus configured light source 102 is supported by substrate 151. Specifically, in the present embodiment, light source 102 is provided on the inner surface (lower surface in FIG. 10) of substrate 151 in a position where light source 102 overlaps in the width direction with first inner through hole 141*i* in housing 141. The light emitted from light source 102 is guided via light guiding main portion 103*a* of light guiding member 103, which will be described later, and exits out of housing 141.

Substrate 151 may be provided with light source 102*a* (see FIG. 12A), which is different from light source 102. Light source 102*a* is provided in a position where the light emitted from light source 102*a* exits out of housing 141 via support portion 103*b* of light guiding member 103, which will be described later. Light source 102*a* may be referred to as a second light source.

Specifically, the light emitted from light source 102*a* enters positioning protruding portion 103*f* of light guiding member 103, which will be described later, via the front end surface of positioning protruding portion 103*f*, travels through support portion 103*b*, and exits out of housing 141 via a first end surface (lower end surface in FIG. 12A) of light guiding main portion 103*a*. The light emitted from light source 102 and the light emitted from light source 102*a* may have the same color or different colors.

In the present embodiment, light source 102 and light source 102*a* are disposed in accommodation space 141*e* of housing 141. It is, however, noted that the accommodation portion that accommodates light source 102 and light source 102*a* may be a space different from accommodation space 141*e*. Light source 102 and light source 102*a* may instead be disposed in accommodation portions separate from each other.

(Light Guiding Member)

Light guiding member 103 (also referred to as second device) has optical transmittance and guides the light from light source 102 in such a way that the light exits out of housing 141. The user or any other person can externally visually recognize the light from light source 102 via light guiding member 103. Thus configured light guiding member 103 is formed of a light guide capable of guiding the light from light source 102. Examples of the material of the light guide may include resin, such as acryl, polycarbonate, polystyrene, or a composite thereof. Light guiding member 103 corresponds to an example of a light guiding portion.

Figure 13A:
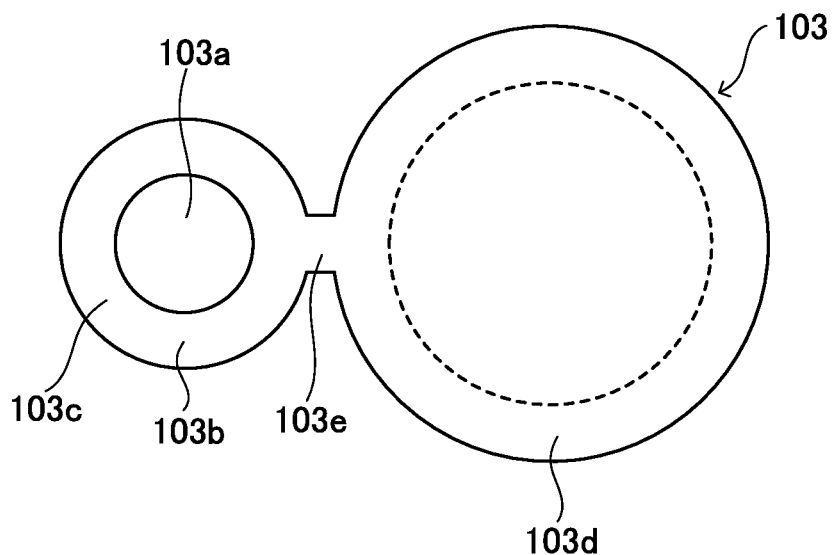
FIG. 13A is a plan view of a light guiding member.
Figure 13B:
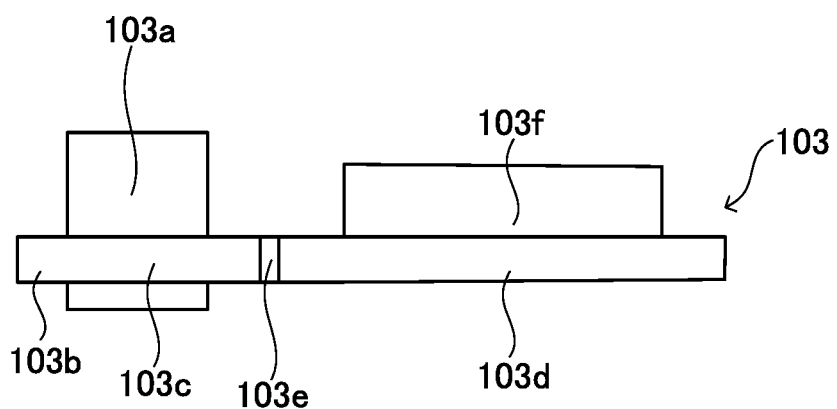
FIG. 13B is a side view of the light guiding member.

Specifically, light guiding member 103 includes light guiding main portion 103*a*, support portion 103*b*, and positioning protruding portion 103*f*, as illustrated in FIGS. 10, 13A, and 13B. Light guiding main portion 103*a* has a solid cylindrical shape and guides the light from light source 102 in such a way that the light exits out of housing 141. The direction of the axis of light guiding main portion 103*a* coincides with the width direction of electronic glasses 100 in the developed state (state illustrated in FIG. 1).

A first end portion of light guiding main portion 103*a* (lower end portion in FIG. 10 and also referred to as one end portion in axial direction) is disposed in through hole for exposure 104*a* of side portion cover 104. In the present embodiment, the first end portion of light guiding main portion 103*a* corresponds to a first protruding portion of light guiding member 103. The first end surface (lower end surface in FIG. 10) of light guiding main portion 103*a* is exposed to the outside via through hole for exposure 104*a* of side portion cover 104, which will be described later.

On the other hand, a second end portion of light guiding main portion 103*a* (upper end portion in FIG. 10 and also referred to as other end portion in axial direction) is inserted through (in other words, held by) first inner through hole 141*i* of inner recessed portion 141*h* of housing 141. In the present embodiment, the second end portion of light guiding main portion 103*a* corresponds to a second protruding portion of light guiding member 103.

In this state, the second end surface (upper end surface in FIG. 10) of light guiding main portion 103*a* faces light source 102. The light from light source 102 enters light guiding main portion 103*a* via the second end surface of light guiding main portion 103*a* and exits out of light guiding main portion 103*a* via the first end surface thereof.

Support portion 103*b* supports light guiding main portion 103*a* with respect to housing 141. Support portion 103*b* is a plate-shaped member and is provided on the outer circumferential surface of light guiding main portion 103*a*. Thus configured support portion 103*b* is disposed between the bottom portion of inner recessed portion 141*h* of housing 141 and side portion cover 104, which will be described later. Specifically, support portion 103*b* includes first cover portion 103*c*, second cover portion 103*d*, and continuous portion 103*e*.

First cover portion 103*c* extends outward from the outer circumferential surface of light guiding main portion 103*a* in the radial direction of light guiding main portion 103*a*. Specifically, first cover portion 103*c* is an annular plate member and has an outer diameter greater than the outer diameter of first inner through hole 141*i*. The inner circumferential edge of first cover portion 103*c* is fixed to and integrated with the outer circumferential surface of light guiding main portion 103*a*.

Thus configured first cover portion 103*c* is in contact with the circumference of first inner through hole 141*i* at the bottom portion of inner recessed portion 141*h*. In this state, first cover portion 103*c* blocks the entirety of a first opening portion (lower opening portion in FIG. 10) that is the gap (specifically, tubular gap) between the inner circumferential surface of first inner through hole 141*i* and outer circumferential surface of light guiding main portion 103*a*. Liquid, such as water, is thus unlikely to enter first inner through hole 141*i*.

Second cover portion 103*d* is continuous with first cover portion 103*c* via continuous portion 103*e*. Second cover portion 103*d* is a disc-shaped plate member and has an outer diameter greater than the outer diameter of second inner through hole 141*j*.

Thus configured second cover portion 103*d* is in contact with the circumference of second inner through hole 141*j* at the bottom portion of inner recessed portion 141*h*. In this state, the entirety of a first opening portion (lower opening portion in FIG. 10) that is second inner through hole 141*hj* is blocked. Liquid, such as water, is thus unlikely to enter second inner through hole 141*j*.

Positioning protruding portion 103*f* is so provided as to be integrated with the outer surface (upper surface in FIG. 10) of second cover portion 103*d*. Positioning protruding portion 103*f* is a solid cylindrical member and protrudes from the outer surface of second cover portion 103*d*.

Positioning protruding portion 103*f* has an inner diameter slightly smaller than the inner diameter of second inner through hole 141*j*. Thus configured positioning protruding portion 103*f* is inserted into second inner through hole 141*j*. The engagement between positioning protruding portion 103*f* and second inner through hole 141*j* prevents light guiding member 103 from rotating.

(Side Portion Cover)

Side portion cover 104 (also referred to as third device) is a plate-shaped member that blocks light. Side portion cover 104 has through hole for exposure 104a (also referred to as light transmissive portion), which exposes the first end surface (lower end surface in FIG. 10) of light guiding main portion 103a to the outside.

Through hole for exposure 104a is provided in housing 141 in a position where through hole for exposure 104a overlaps with first inner through hole 141i in the width direction. The light transmissive portion is not limited to the through hole in the present embodiment and may be any component that can transmit the light guided via the light guiding member 103. For example, the light transmissive portion may be a member having optical transmittance and provided in part of side portion cover 104 (resin member having optical transmittance, for example).

Thus configured side portion cover 104 is so disposed in inner recessed portion 141h of housing 141 as to be shifted inward (lower side in FIG. 10) in the width direction from support portion 103b of light guiding member 103. Side portion cover 104 is fixed to inner recessed portion 141h of housing 141 via adhesive member 105, which will be described later.

In this state, the first end portion (lower end portion in FIG. 10) of light guiding main portion 103a is inserted into through hole for exposure 104a. The first end surface of light guiding main portion 103a is thus exposed to the outside via through hole for exposure 104a.

Identification information 104b (see FIGS. 4 and 5B), for example, a logo mark, is imparted to the inner surface of side portion cover 104. Identification information 104b is formed on the inner surface of side portion cover 104, for example, by laser processing, carving, or printing. The inner surface of side portion cover 104 is flush with the inner surface of housing 141 (specifically, inner wall portion 141b).

(Adhesive Member)

Adhesive member 105 is disposed between the bottom portion of inner recessed portion 141h of housing 141 and side portion cover 104 and fixes side portion cover 104 to the bottom portion of inner recessed portion 141h. Adhesive member 105 is, for example, a double-sided tape and has an accommodation hole 105a (see FIGS. 4 and 10), which allows support portion 103b of light guiding member 103 to be disposed therein. The outer surface of thus configured adhesive member 105 is bonded to the bottom portion of inner recessed portion 141h. On the other hand, the inner surface of adhesive member 105 is bonded to the outer surface of side portion cover 104.

Specifically, adhesive member 105 has an outer surface (also referred to as first surface) and an inner surface (also referred to as second surface). The outer surface of adhesive member 105 is bonded to the bottom portion of inner recessed portion 141h. On the other hand, the inner surface of adhesive member 105 is bonded to the outer surface of side portion cover 104. In this state, adhesive member 105 surrounds the entire circumference of first inner through hole 141i.

In the present embodiment, accommodation hole 105a is a through hole. Accommodation hole 105a has a size that allows first inner through hole 141i of housing 141, second inner through hole 141j of housing 141, and through hole for exposure 104a of side portion cover 104 to fall within the outer circumferential edge of accommodation hole 105a when viewed in the width direction.

In other words, accommodation hole 105a overlaps with second inner through hole 141j, first inner through hole 141i, and through hole for exposure 104a in the width direction. First inner through hole 141i, through hole for exposure 104a, and accommodation hole 105a overlap with each other in the width direction.

Accommodation hole 105a does not necessarily have a specific shape and may have any shape that allows support portion 103b of light guiding member 103 to be disposed therein. Support portion 103b of light guiding member 103 is disposed in thus configured accommodation hole 105a.

Adhesive member 105 does not necessarily have the configuration in the present embodiment and may have any configuration that allows side portion cover 104 to be fixed to the bottom portion of inner recessed portion 141h. For example, adhesive member 105 may be an adhesive.

Adhesive member 105 may be omitted. In the case where adhesive member 105 is omitted, side portion cover 104 is fixed to inner recessed portion 141h, for example, in a press fit process.

(Front End Portion Cover)

Front end portion cover 146 (see FIGS. 4 and 7) is so disposed as to cover first opening portion 1413 of temple 140 at the front end portion of temple 140. Thus configured front end portion cover 146 is a box-shaped member that opens on the rear end side.

Specifically, front end portion cover 146 includes tubular portion 146A, which has a rectangular cross-section, and front wall portion 146e, which blocks a front opening portion of tubular portion 146A. Tubular portion 146A is formed of first wall portion 146a and second wall portion 146b, which face each other in the width direction, and third wall portion 146c and fourth wall portion 146d, which face each other in the upward/downward direction.

Figure 7:
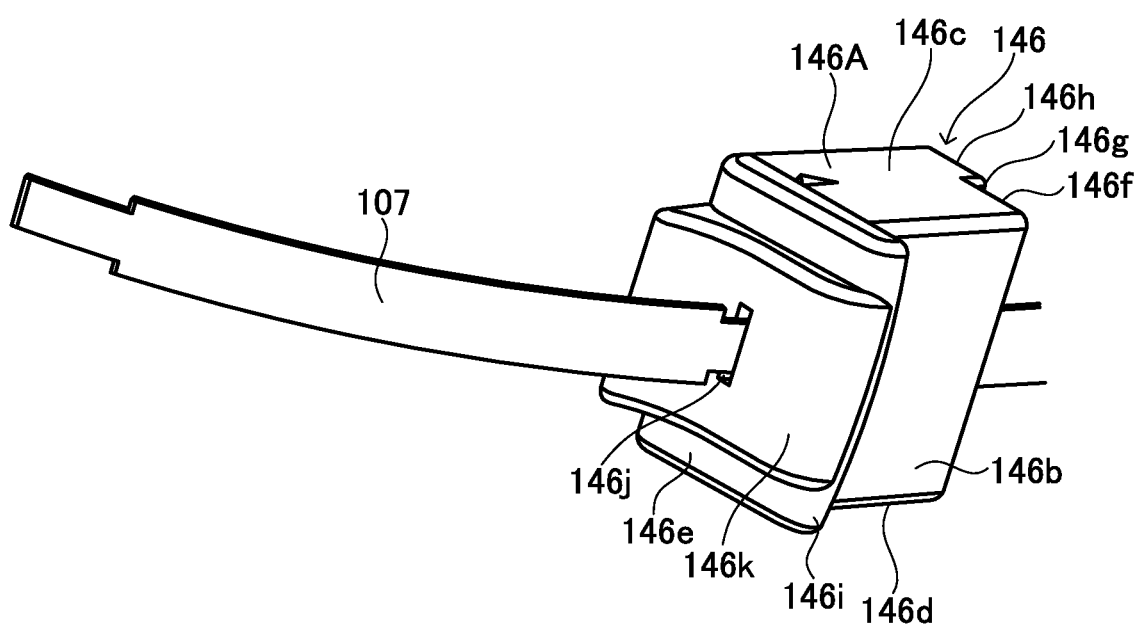
FIG. 7 is a perspective view of a front end portion cover.
Figure 9:
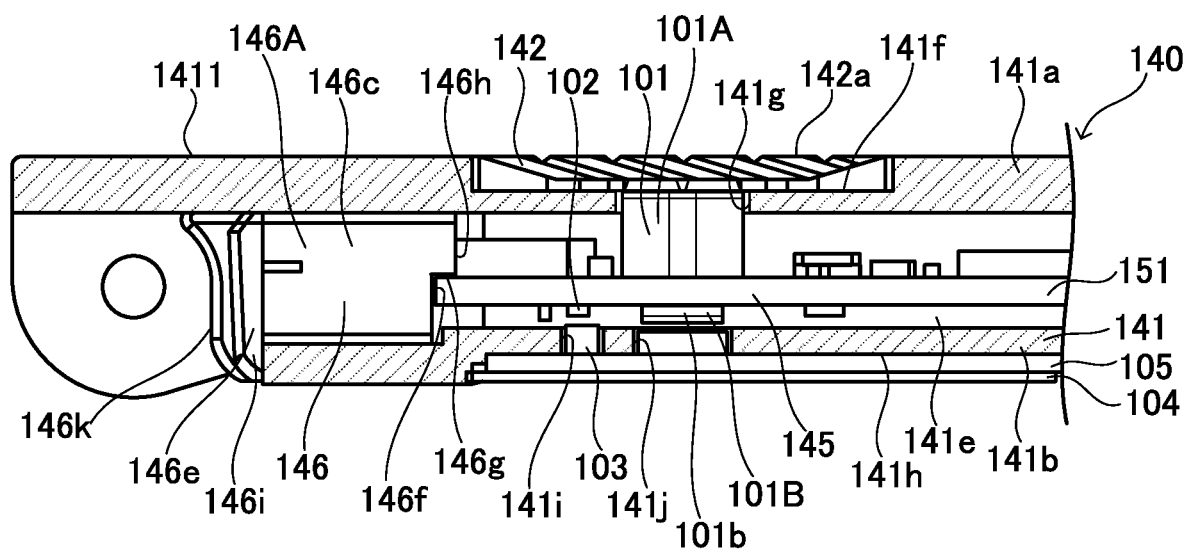
FIG. 9 is an enlarged view of portion X in FIG. 8.

A rear end surface of each of third wall portion 146c and fourth wall portion 146d is provided with positioning recessed portion 146f, positioning stepped portion 146g, and positioning protruding portion 146h sequentially arranged from the inner side in the width direction (lower side in FIGS. 7 and 9).

Tubular portion 146A is inserted into first opening portion 1413 of temple 140 in the assembled state (state illustrated in FIGS. 9 and 10). In this state, a front end portion of substrate 151 is in contact with positioning recessed portion 146f and positioning stepped portion 146g.

Substrate 151 is thus positioned in the frontward direction (leftward direction in FIG. 9) and in the outward direction of the width direction (upper side in FIG. 9). Positioning of substrate 151 in the rearward direction (rightward direction in FIG. 9) is achieved by engagement between a rear end portion of substrate 151 and the inner surface of housing 141. Positioning of substrate 151 in the inward direction of the width direction (downward direction in FIG. 9) is achieved by engagement between contact receiving portion 142 fixed to substrate 151 via connection member 101 and outer recessed portion 141f of housing 141.

Front wall portion 146e includes positioning jaw-shaped portion 146i, which extends inward in the width direction from tubular portion 146A (specifically, second wall portion 146b). Thus configured positioning jaw-shaped portion 146i is in contact with a front end portion of inner wall portion 141b of housing 141.

Rearward positioning of front end portion cover 146 with respect to housing 141 is thus achieved. Positioning of front end portion cover 146 in the width direction and in the upward/downward direction is achieved by engagement between tubular portion 146A and the inner surface of housing 141.

Front wall portion 146e includes through hole for FPC 146j, through which FPC 107 (see FIGS. 4 and 7) connected to substrate 151 is insertable. The front surface of front wall portion 146e has guiding surface 146k, which smoothly inclines rearward by a greater amount with greater distance from the outer side toward the inner side in the width direction.

Guiding surface 146k guides temple 140 in such a way that temple 140 smoothly pivots with respect to widthwise opposite end portions of front portion 130. Guiding surface 146k is made up of a combination of curves and straight lines. The shape of thus configured guiding surface 146k is determined as appropriate in accordance with the shape of the widthwise opposite end portions of front portion 130.

(Controller)

Controller 160 is electrically connected to detection pad 153 of detection section 145 and the electrodes (first electrode 112 and second electrode 114) of each of lenses 110. Controller 160 applies voltage to the pair of lenses 110 or stops the application of voltage to the pair of lenses 110 in accordance with an input operation signal to switch the optical characteristics of first area 1101 (electrically active area) of each of the pair of lenses 110.

Specifically, controller 160 applies voltage to the pair of lenses 110 or stops the application of voltage to the pair of lenses 110 when detection section 145 detects contact between the target object and contact receiving portion 142 to switch the focal length (strength) of first area 1101 (see FIG. 2).

Controller 160 includes, for example, a control circuit for controlling the detection of a change in capacitance in detection pad 153 and the application of voltage to first area 1101 of each of the lenses 110. Controller 160 is mounted, for example, on substrate 151 in detection section 145.

(Power Supply)

Power supply 170 supplies detection section 145 and controller 160 with electric power (see FIG. 2). In the present embodiment, power supply 170 is a rechargeable battery pack detachably held at the other end portion (second opening portion provided in rear end portion) of temple 140. Examples of power supply 170 include a nickel-hydrogen rechargeable battery.

(Method for Assembling Temples)

The procedure of assembling the temple 140 will be described below. Substrate 151 is first inserted into accommodation space 141e via first opening portion 1413 of housing 141, as illustrated in FIG. 15A. In this process, the insertion of substrate 151 is assisted by causing an end portion of substrate 151 that is the end portion in the transverse direction (specifically, end portion in upward/downward direction) to engage with first guiding groove 141k and second guiding groove 141m of housing 141.

Contact receiving portion 142 is then placed in outer recessed portion 141f of housing 141. In this process, outer connection member 101A integrated with contact receiving portion 142 is inserted through outer through hole 141g of housing 141. Inner connection member 101B is then caused to enter accommodation space 141e via second inner through hole 141j of housing 141.

Shaft portion 101c of inner connection member 101B is then inserted through through hole 157A of detection section 145. Inner engagement portion 101e of inner connection member 101B is then caused to engage with (screw to) outer engagement portion 101a of outer connection member 101A. In this process, inner connection member 101B is rotated with tool 180 (see FIG. 12B), such as a screw driver, caused to enter accommodation space 141e via second inner through hole 141j of housing 141.

Light guiding main portion 103a of light guiding member 103 is then inserted into first inner through hole 141i of housing 141, and positioning protruding portion 103f of light guiding member 103 is inserted into second inner through hole 141j of housing 141. In this state, first cover portion 103c of light guiding member 103 blocks the entire first opening portion (lower opening portion in FIG. 10) that is the gap between the inner circumferential surface of first inner through hole 141i of housing 141 and the outer circumferential surface of light guiding main portion 103a.

On the other hand, in the state described above, second cover portion 103d of light guiding member 103 blocks the entire first opening portion (lower opening portion in FIG. 10) that is the second inner through hole 141j. Adhesive member 105 is then bonded to the bottom portion of inner recessed portion 141h of housing 141. In this state (state illustrated in FIG. 16A), support portion 103b of light guiding member 103 is inserted into accommodation hole 105a of adhesive member 105.

Side portion cover 104 is then so bonded to adhesive member 105 as to be disposed in inner recessed portion 141h of housing 141. In this state (state illustrated in FIG. 16B), an end surface of light guiding main portion 103a that is the first end surface (lower end surfaces in FIG. 10) in the axial direction is disposed in through hole for exposure 104a of side portion cover 104.

(Operation of Electronic Glasses)

An example of the operation of electronic glasses 100 will next be described. The description will first be made of the state in which no voltage is applied to liquid crystal layers 113 of electronic glasses 100 (OFF state). In the OFF state, the refractive index of liquid crystal layer 113 is roughly equal to the refractive index of first substrate 111 and second substrate 115 in first area 1101 of each of lenses 110.

No lens effect resulting from liquid crystal layer 113 therefore occurs. The focal length (strength) of first area 1101 is therefore roughly equal to the focal length (strength) of second area 1102 in lens 110.

When the target object (user's finger, for example), which is an electrical conductor, comes into contact with contact receiving portion 142, a change in the capacitance based on the contact is detected with detection pad 153 of detection section 145. The result of the detection of the contact is transmitted to controller 160. When controller 160 senses that the target object has come into contact with contact receiving portion 142 in the OFF state, controller 160 applies voltage to first area 1101 of each of lenses 110.

The orientation of the liquid crystal material in liquid crystal layer 113 therefore changes, and the refractive index of liquid crystal layer 113 changes accordingly (ON state). Therefore, in the ON state, the refractive index of liquid crystal layer 113 differs from the refractive index of first substrate 111 and second substrate 115. The lens effect resulting from liquid crystal layer 113 therefore occurs in first area 1101. The focal length (strength) of first area 1101 can therefore be changed.

In the ON state, when the target object comes into contact with contact receiving portion 142, the result of the detection of the contact is transmitted to controller 160, as in the same manner described above. When controller 160 senses that the target object has come into contact with contact receiving portion 142 in the ON state, controller 160 stops the application of voltage to first area 1101 of lens 110. The orientation of the liquid crystal material in liquid crystal layer 113 therefore returns to the state before the voltage application, and the refractive index of liquid crystal layer 113 also returns to the state before the voltage application (OFF state).

As described above, in electronic glasses 100 according to the present embodiment, contact between the target object and contact receiving portion 142 allows the focal length of first area 1101 of each of lenses 110 to be switched to the other.

(Actions and Effects)

The present embodiment having the configuration described above allows reduction in the dimension (thickness dimension in the present embodiment) of a portion of each of temples 140 of electronic glasses 100 that is the portion where contact receiving portion 142, which is the first device, and light guiding member 103, which is the second device, are provided. That is, in the present embodiment, light guiding member 103 is disposed in inner recessed portion 141h of temple 140, and contact receiving portion 142 is disposed in outer recessed portion 141f of temple 140. The dimension of temple 140 in the width direction (thickness dimension) can therefore be reduced, whereby thin temple 140 can be provided, as compared with a structure in which no inner recessed portion 141h or outer recessed portion 141f is provided. As a result, the burden on the user's head and ears is reduced, and the user has an improved wearing feel.

Further, in the present embodiment, tool 180 (see FIG. 12B) is caused to enter accommodation space 141e via second inner through hole 141j provided in inner recessed portion 141h to allow inner connection member 101B to engage with outer connection member 101A.

Further, in the present embodiment, inner recessed portion 141h, which is provided with second inner through hole 141j, is covered with side portion cover 104. Second inner through hole 141j is therefore not exposed to the outside (that is, externally invisible). As a result, the exterior appearance of temple 140 can be improved. Further, the number of parts can be reduced because no other member for blocking second inner through hole 141j needs to be provided.

Further, the present embodiment having the configuration described above can suppress entry of liquid, such as water, into accommodation space 141e of housing 141, where light source 102 is disposed. That is, in the present embodiment, light guiding member 103 disposed in inner recessed portion 141h of temple 140 is covered with side portion cover 104 externally in the width direction. Thus configured side portion cover 104 is effective in preventing entry of liquid, such as water, into inner recessed portion 141h. As a result, side portion cover 104 can prevent entry of liquid into accommodation space 141e via the gap between the outer circumferential surface of light guiding main portion 103a of light guiding member 103 and the inner circumferential surface of first inner through hole 141i of housing 141.

In the present embodiment, in particular, first cover portion 103c of light guiding member 103 blocks the entire first opening portion (lower opening portion in FIG. 10) that is the gap between the inner circumferential surface of first inner through hole 141i and the outer circumferential surface of light guiding main portion 103a. The configuration described above is also effective in preventing entry of liquid into accommodation space 141e.

First cover portion 103c allows an increase in the length of a water entry path from through hole for exposure 104a of side portion cover 104 and first inner through hole 141i and further allows refraction. The configuration described above is also effective in preventing entry of liquid into accommodation space 141e.

Further, in the present embodiment, adhesive member 105 surrounds the entire circumference of first inner through hole 141i and is bonded to the bottom portion of inner recessed portion 141h and the outer surface of side portion cover 104. Thus configured adhesive member 105 is effective in preventing liquid having entered inner recessed portion 141h from the portion around side portion cover 104 from entering first inner through hole 141i.

Second cover portion 103d of light guiding member 103 blocks the entire first opening portion (lower opening portion in FIG. 10) that is the gap between the inner circumferential surface of second inner through hole 141j and the outer circumferential surface of positioning protruding portion 103f. The configuration described above is also effective in preventing entry of liquid into accommodation space 141e.

Further, in the present embodiment, light guiding member 103 is supported by housing 141 based on the configuration in which the bottom portion of inner recessed portion 141h of housing 141 and side portion cover 104 sandwich support portion 103b of light guiding member 103. No fixing portion for fixing light guiding member 103 to housing 141 (for example, with a bonding or fastening member) is therefore required. As a result, light guiding member 103 is readily assembled. Further, the configuration described above allows reduction in the number of constituent parts that form temple 140, whereby the weight of temple 140 can be reduced.

Embodiment 2

Electronic glasses according to Embodiment 2 of the present invention will be described with reference to FIG. 17. In the electronic glasses and frame according to Embodiment 2, the configuration of temples 240 differs from the configuration of temples 140 according to Embodiment 1. Only temples 240 will therefore be described below, and the same constituent elements as those of electronic glasses 100 and frame 120 according to Embodiment 1 have the same reference characters and will not be described.

Figure 17:
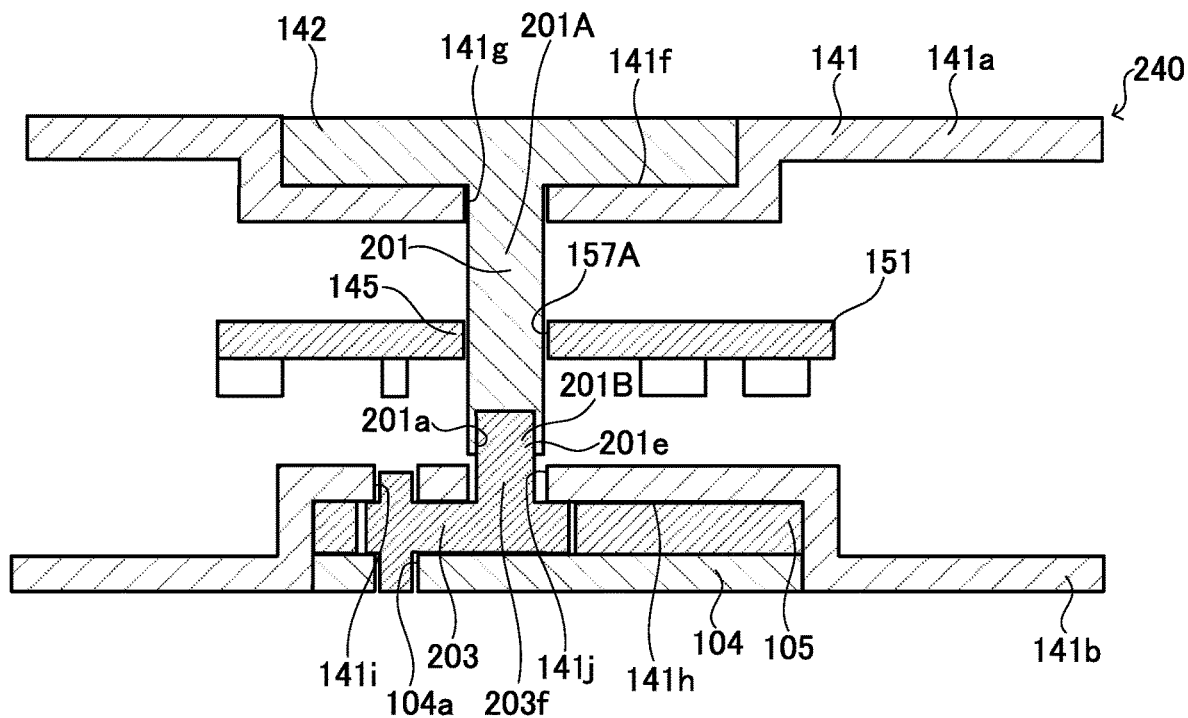
FIG. 17 is a cross-sectional diagrammatic view of a portion of a temple of electronic glasses according to Embodiment 2 that is the portion corresponding to portion X in FIG. 8.

FIG. 17 is a partial cross-sectional diagrammatic view of one of temples 240 of the electronic glasses according to Embodiment 2. In the present embodiment, the structure of connection member 201 of temple 240 differs from that in Embodiment 1 described above. Specifically, in the present embodiment, inner connection member 201B of connection member 201 is so provided at a front end portion (upper end portion in FIG. 17) of positioning protruding portion 203f of light guiding member 203 as to be integrated with positioning protruding portion 203f.

A front end portion of thus configured inner connection member 201B is provided with inner engagement portion 201e, which can engage with outer engagement portion 201a, which will be described later. Inner engagement portion 201e is, for example, a female threaded portion, a male threaded portion, a protruding portion, or a recessed portion. Inner connection member 201B may be a fastening member separate from light guiding member 203.

Also in the present embodiment, outer connection member 201A of connection member 201 is so provided on the inner surface of contact receiving portion 142 as to be integrated with contact receiving portion 142. It is, however, noted that outer connection member 201A is longer than outer connection member 101A in Embodiment 1 described above.

A front end portion of outer connection member 201A is provided with outer engagement portion 201a, which can engage with inner engagement portion 201e. Outer engagement portion 201a is, for example, a female threaded portion, a male threaded portion, a protruding portion, or a recessed portion. Thus configured outer connection member 201A is inserted through outer through hole 141g of housing 141 and through hole 157A of detection section 145 externally in the width direction. Outer connection member 201A may be a fastening member separate from contact receiving portion 142.

In this state, inner engagement portion 201e of inner connection member 201B engages with outer engagement portion 201a of outer connection member 101A. The engagement between inner engagement portion 201e and outer engagement portion 201a may be any of a variety of engagement forms (press fit, screw engagement, and key engagement, for example) according to the structures of inner engagement portion 201e and outer engagement portion 201a.

The engagement between inner engagement portion 201e and outer engagement portion 201a described above causes contact receiving portion 142, which is the first device, and light guiding member 203, which is the second device, to be fixed to each other via connection member 201. Light guiding member 203 and contact receiving portion 142 are thus fixed to housing 141 via connection member 201.

Although not described in detail, a connection portion for electrically connecting contact receiving portion 142 to detection section 145 is provided between contact receiving portion 142 and detection section 145 also in the present embodiment. The other structures and actions/effects are the same as those in Embodiment 1 described above.

Embodiment 3

Electronic glasses according to Embodiment 3 of the present invention will be described with reference to FIG. 18. In the electronic glasses and frame according to Embodiment 3, the configuration of temples 340 differs from the configuration of temples 140 according to Embodiment 1. Only temples 340 will therefore be described below, and the same constituent elements as those of electronic glasses 100 and frame 120 according to Embodiment 1 have the same reference characters and will not be described.

Figure 18:
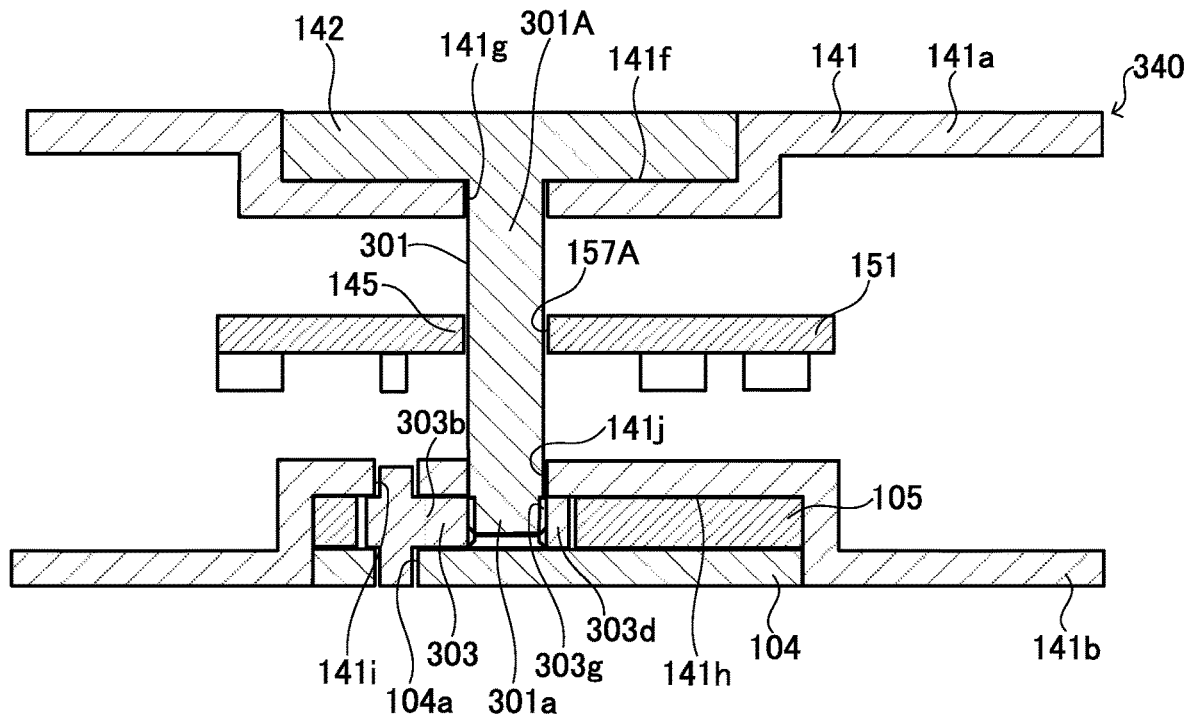
FIG. 18 is a cross-sectional diagrammatic view of a portion of a temple of electronic glasses according to Embodiment 3 that is the portion corresponding to portion X in FIG. 8.

FIG. 18 is a partial cross-sectional diagrammatic view of one of temples 340 of the electronic glasses according to Embodiment 3. In the present embodiment, the structures of connection member 301 and light guiding member 303 of temple 340 differ from those in Embodiment 1 described above.

Specifically, in the present embodiment, light guiding member 303 includes no positioning protruding portion 103f, with which light guiding member 103 in Embodiment 1 described above is provided. Instead, second cover portion 303d of support portion 303b of light guiding member 303 includes inner engagement portion 303g, which can engage with outer engagement portion 301a, which will be described later. Inner engagement portion 303g is, for example, a through hole having a cylindrical inner circumferential surface or a threaded hole having a female threaded portion formed on the inner circumferential surface.

Connection member 301 includes no inner connection member. On the other hand, also in the present embodiment, outer connection member 301A of connection member 301 is so provided on the inner surface of contact receiving portion 142 as to be integrated with contact receiving portion 142. It is, however, noted that outer connection member 301A is longer than outer connection member 101A in Embodiment 1 described above. A front end portion of outer connection member 301A includes outer engagement portion 301a, which can engage with inner engagement portion 303g. Outer engagement portion 301a is, for example, a male threaded portion or a protruding portion.

Thus configured outer connection member 301A is inserted through outer through hole 141g of housing 141, through hole 157A of detection section 145, and second inner through hole 141j of housing 141 externally in the width direction. In this state, outer engagement portion 301a of outer connection member 301A engages with inner engagement portion 303g of light guiding member 303. In the present embodiment, outer engagement portion 301a functions as a positioning protruding portion of light guiding member 303.

The engagement between outer engagement portion 301a and inner engagement portion 303g described above causes contact receiving portion 142, which is the first device, and light guiding member 303, which is the second device, to be fixed to each other via connection member 301. Although not described in detail, a connection portion for electrically connecting contact receiving portion 142 to detection section 145 is provided between contact receiving portion 142 and detection section 145 also in the present embodiment. Outer connection member 301A may be a fastening member separate from contact receiving portion 142. The other structures and actions/effects are the same as those in Embodiment 1 described above.

Embodiment 4

Electronic glasses according to Embodiment 4 of the present invention will be described with reference to FIG. 19. In the electronic glasses and frame according to Embodiment 4, the configuration of temples 440 differs from the configuration of temples 140 according to Embodiment 1. Only temples 440 will therefore be described below, and the same constituent elements as those of electronic glasses 100 and frame 120 according to Embodiment 1 have the same reference characters and will not be described.

Figure 19:
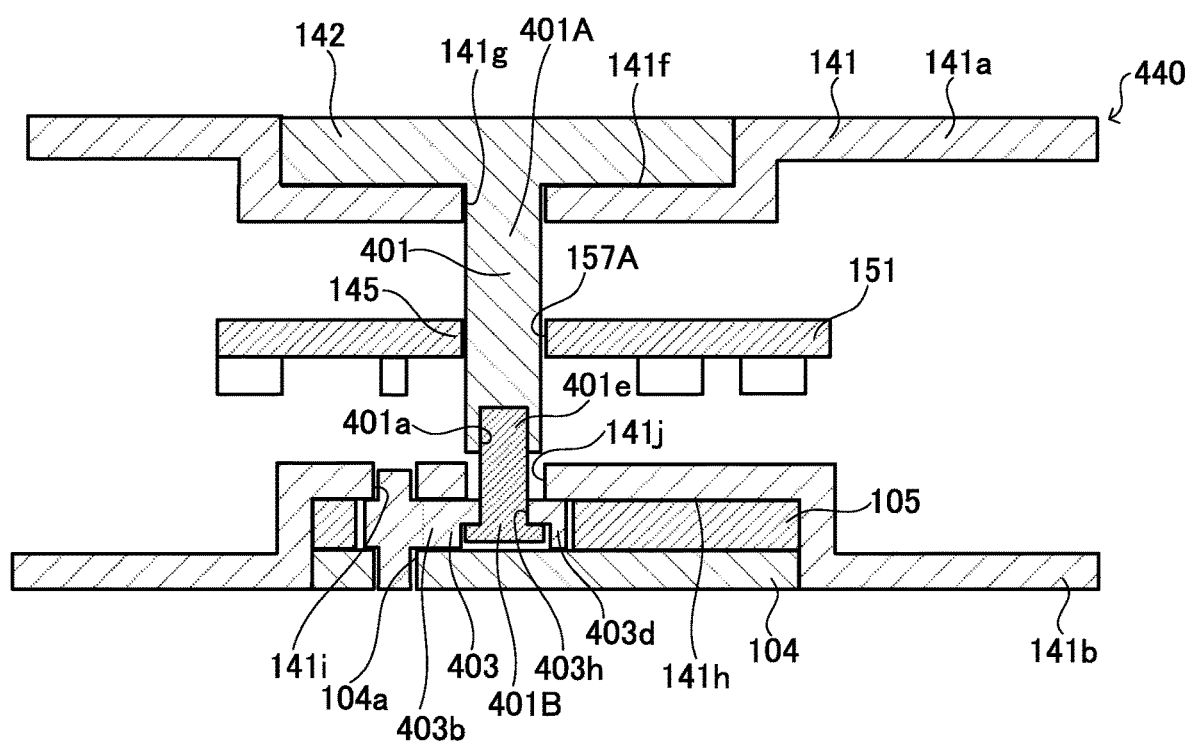
FIG. 19 is a cross-sectional diagrammatic view of a portion of a temple of electronic glasses according to Embodiment 4 that is the portion corresponding to portion X in FIG. 8.

FIG. 19 is a partial cross-sectional diagrammatic view of one of temples 440 of the electronic glasses according to Embodiment 4. In the present embodiment, the structures of light guiding member 403 and connection member 401 of temple 440 differ from those in Embodiment 1 described above.

Specifically, in the present embodiment, second cover portion 403d of support portion 403b of light guiding member 403 includes stepped hole 403h. Stepped hole 403h is so shaped that the inner diameter of an inner half portion in the width direction (lower half portion in FIG. 19) greater than the inner diameter of an outer half portion in the width direction (upper half portion in FIG. 19).

Inner connection member 401B of connection member 401 is a fastening member, such as a screw and a bolt. Inner connection member 401B includes inner engagement portion 401e, which can engage with outer engagement portion 401a, which will be described later. Inner engagement portion 401e is, for example, a male threaded portion formed on the outer circumferential surface of inner connection member 401B. Thus configured inner connection member 401B is inserted through stepped hole 403h and second inner through hole 141j of housing 141 from the inner side in the width direction.

Also in the present embodiment, outer connection member 401A of connection member 401 is so provided on the inner surface of contact receiving portion 142 as to be integrated with contact receiving portion 142. It is, however, noted that outer connection member 401A is longer than outer connection member 101A in Embodiment 1 described above.

Outer connection member 401A includes outer engagement portion 401a, which can engage with inner engagement portion 401e. Outer engagement portion 401a is, for example, a female threaded portion formed on the inner circumferential surface of a tubular front end portion of outer connection member 401A. Thus configured outer connection member 401A is inserted through outer through hole 141g of housing 141 and through hole 157A of detection section 145 from the outer side in the width direction. Outer connection member 401A may be a fastening member separate from contact receiving portion 142.

In this state, inner engagement portion 401e of inner connection member 401B engages with outer engagement portion 401a of outer connection member 401A. The engagement between inner engagement portion 401e and outer engagement portion 401a may be any of a variety of engagement forms (press fit, screw engagement, and key engagement, for example) according to the structures of inner engagement portion 401e and outer engagement portion 401a.

The engagement between inner engagement portion 401e and outer engagement portion 401a described above causes contact receiving portion 142, which is the first device, and light guiding member 403, which is the second device, to be fixed to each other via connection member 401. Light guiding member 403 and contact receiving portion 142 are thus fixed to housing 141 via connection member 401.

Although not described in detail, a connection portion for electrically connecting contact receiving portion 142 to detection section 145 is provided between contact receiving portion 142 and detection section 145 also in the present embodiment. The other structures and actions/effects are the same as those in Embodiment 1 described above.

(Additional Remarks)

The above embodiments have been described with reference to the case where the inner surface of each of the temples is the first surface and the outer surface of each of the temples is the second surface. It is, however, noted that the outer surface of each of the temples may be the first surface and the inner surface of each of the temples may be the second surface. In this case, the device (contact receiving portion 142, for example) disposed on outer recessed portion 141f provided in the outer surface of the temple is the first device, and the device (light guiding member 403) disposed on inner recessed portion 141h provided in the inner surface of the temple is the second device. Outer through hole 141g in outer recessed portion 141f is the first hole. In a case where the configuration described above is employed, a component so configured that at least part thereof can be inserted through outer through hole 141g and the component can fix light guiding member 403 to the housing is employed as the fastening member.

One of the upper and lower surfaces of the temple may be the first surface, and the other surface may be the second surface. In this case, at least part of the first recessed portion of the first surface and at least part of the second recessed portion of the second surface face each other in the upward/downward direction (height direction). The configuration described above allows reduction in the dimension (height dimension) of a portion of each of temples 140 of electronic glasses 100 that is the portion where contact receiving portion 142, which is the first device, and light guiding member 103, which is the second device, are provided.

The above embodiments have been described with reference to the case where the first device is contact receiving portion 142 and the second device is light guiding member 103. The first and second devices are, however, not limited to those specified in the embodiments described above. For example, the first and second devices can each be formed of at least one selected from an acoustic device, a video device, a light emitting device, and a sensor device. Specifically, in a case where the device disposed in outer recessed portion 141f is the first device, examples of the first device may include a camera, a display, and a touch sensor. On the other hand, in a case where the device disposed in inner recessed portion 141h is the second device, examples of the second device may include a light emitting device, a loudspeaker, a microphone, and a projector. The light emitting device includes a member that forms a light emitting device when the member is combined with light source 102, such as light guiding members 103 to 403 in the embodiments described above.

In a case where the pair of temples are configured to be bilaterally symmetric in the rightward/leftward direction, the left-side temple is so configured that the left-side temple and the right-side temple 140 in each of the embodiments described above are bilaterally symmetric in the rightward/leftward direction. One of the pair of temples may have the configuration of the temple 140 according to any of the embodiments described above, and the other may be formed only of the housing.

Further, the above embodiments have been described with reference to the case where the eyewear is electronic glasses, but the eyewear according to the present invention is not limited to electronic glasses. Examples of the eyewear may include sunglasses, goggles, and head mounted display.

The disclosure of Japanese Patent Application Nos. 2017-183305 and No. 2017-183307, both filed on Sep. 25, 2017, including the specification, drawings, and abstract, is incorporated herein by reference in its entirety.

INDUSTRIAL APPLICABILITY

The frame component according to the present invention is preferably usable with the temples and frame for a variety of eyewears and a variety of eyewears.

REFERENCE SIGNS LIST

100 Electronic glasses (eyewear)
110 Lens
1101 First area (electrically active area)
1102 Second area
111 First substrate
112 First electrode
113 Liquid crystal layer
114 Second electrode
115 Second substrate
116 Adhesive layer
117 Diffraction area
1171 Protruding portion
1172 First protruding stripe
120 Frame
130 Front portion
131 Rim
132 Bridge
133 Nose pad
140, 240, 340, 440 Temple
141 Housing
141a Outer wall portion 141b Inner wall portion
141c Upper wall portion
141d Lower wall portion
141e Accommodation space
141f Outer recessed portion
141g Outer through hole
141h Inner recessed portion
141i First inner through hole
141j Second inner through hole
141k First guiding groove
141m Second guiding groove
141n Parallel groove portion
141p Inclining groove portion
1411 Second protruding stripe
1413 First opening portion
142 Contact receiving portion
142a Contact-receiving-portion-side stripe
145 Detection section
146 Front end portion cover
146A Tubular portion
146a First wall portion
146b Second wall portion
146c Third wall portion
146d Fourth wall portion
146e Front wall portion
146f Positioning recessed portion
146g Positioning stepped portion
146h Positioning protruding portion
146i Positioning jaw-shaped portion
146j Through hole for FPC
146k Guiding surface
148 Electrically conductive plate
148a Inner conduction portion
150 Laminate for detection
151 Substrate
151a Outer substrate
151b Inner substrate
152 Second grounded portion
153 Detection pad
153a Detection area
155 Outer plate-shaped member
155a Outer conduction portion
156a to 156e Insulating layer
157A Through hole
157a to 157k Through hole element
158A Conduction portion
158a to 158k Conduction portion
101, 201, 301, 401 Connection member
101A, 201A, 301A, 401A Outer connection member
101B, 201B, 401B Inner connection member
101a, 201a, 301a, 401a Outer engagement member
101b Head portion
101c Shaft portion
101d Engagement portion
101e, 201e, 401e Inner engagement portion
102 Light source
102a Light source
103, 203, 303, 403 Light guiding member
103a Light guiding main portion
103b, 303b, 403b Support portion
103c First cover portion
103d, 303d, 403d Second cover portion
103e Continuous portion
103f, 203f Positioning protruding portion
303g Inner engagement portion
403h Stepped hole
104 Side portion cover
104a Through hole for exposure
104b Identification information
105 Adhesive member
105a Accommodation hole
107 FPC
160 Controller
170 Power supply
180 Tool

What is claimed is:

1. A frame component that forms a frame of an eyewear, the frame component comprising:
a housing having a first surface on which a first recessed portion is formed and a first hole that opens to the first recessed portion;
a first device disposed in the first recessed portion; and
a fastening member that is inserted through the first hole and fixes the first device to the housing; and
a substrate that is disposed in an accommodation space of the housing and has a substrate-side through hole,
wherein the fastening member is inserted through the substrate-side through hole.

2. The frame component according to claim 1, wherein the housing has a second surface that faces the first surface in a predetermined direction and has a second recessed portion and a second hole that opens to the second recessed portion.

3. The frame component according to claim 2, wherein the first and the second recessed portions at least partially overlap each other in a thickness or height direction of the frame.

4. The frame component according to claim 2, wherein the fastening member is allowed to pass through the second hole externally from a position outside of the housing and is placeable in the accommodation space.

5. The frame component according to claim 2, wherein the fastening member is inserted through the second hole.

6. The frame component according to claim 2, wherein a second device is disposed in the second recessed portion.

7. The frame component according to claim 6, wherein the first and the second devices at least partially overlap each other in a thickness or height direction of the frame.

8. The frame component according to claim 6, wherein the substrate includes a controller electrically connected to the first and the second devices.

9. The frame component according to claim 6, wherein the first and the second devices are at least one selected from an acoustic device, a video device, a light emitting device, and a sensor device.

10. The frame component according to claim 6, wherein the second surface is a surface facing a user wearing the frame component,
the first device is any of a camera, a display, and a touch sensor, and
the second device is any of a light emitting device, a loudspeaker, a microphone, and a projector.

11. The frame component according to claim 6, wherein the housing includes a holding portion that opens to the second recessed portion, and part of the second device is held by the holding portion.

12. The frame component according to claim 6, further comprising:
a first light source disposed in an accommodation portion of the housing;
a light guiding portion that is the second device and includes a light guide that guides light emitted from first light source and causes the light to exit outside of the housing; and a third device that includes a light transmissive portion capable of transmitting the light guided by the light guiding portion and externally covers at least part of the light guiding portion.

13. The frame component according to claim 12, wherein the light guiding portion and the third device are disposed in the second recessed portion.

14. The frame component according to claim 12, wherein:
the housing includes a holding portion that opens to the second recessed portion,
the first light source is so disposed in the accommodation portion as to be adjacent to the holding portion,
part of the light guiding portion is inserted into the holding portion, and
the light emitted from the first light source enters part of the light guiding portion inserted into the holding portion.

15. A temple for eyewear, wherein:
the temple is formed of the frame component according to claim 1, and
the housing forms an outer shape of the temple.

16. The temple according to claim 15, wherein the first recessed portion is disposed in a first half portion of the housing in a longitudinal direction of the housing.

17. A frame for eyewear, the frame comprising:
the temple according to claim 15.

18. An eyewear, comprising:
an optical component having an optical characteristic that changes when electrically controlled;
the frame according to claim 17 that holds the optical component; and
a controller that electrically controls the optical component.

19. The eyewear according to claim 18, wherein:
the optical component is a pair of lenses each having an electrically active area where an optical characteristic of the electrically active area changes when electrically controlled, and
the controller applies voltage to the pair of lenses or stops applying the voltage to the pair of lenses in accordance with an operation signal input to the controller to change the optical characteristic of the electrically active area of each of the pair of lenses.

* * * * *